(12) United States Patent
Kellogg

(10) Patent No.: US 7,796,468 B2
(45) Date of Patent: Sep. 14, 2010

(54) PREDICTION OF SHALLOW DRILLING HAZARDS USING SEISMIC REFRACTION DATA

(75) Inventor: Stephen C. Kellogg, Dhahran (SA)

(73) Assignee: Saudi Arabian Oil Company, Schaan (LI)

( * ) Notice: Subject to any disclaimer, the term of this patent is extended or adjusted under 35 U.S.C. 154(b) by 641 days.

(21) Appl. No.: 10/590,833

(22) PCT Filed: Feb. 28, 2005

(86) PCT No.: PCT/US2005/006643

§ 371 (c)(1),
(2), (4) Date: Jun. 18, 2007

(87) PCT Pub. No.: WO2006/028501

PCT Pub. Date: Mar. 16, 2006

(65) Prior Publication Data

US 2007/0255501 A1 Nov. 1, 2007

Related U.S. Application Data

(60) Provisional application No. 60/548,515, filed on Feb. 26, 2004.

(51) Int. Cl.
*G01V 1/28* (2006.01)
(52) U.S. Cl. .............. 367/31; 367/52; 367/73
(58) Field of Classification Search ............ 367/25–26, 367/36–38, 43, 57, 68, 73, 31, 52; 702/6, 702/9
See application file for complete search history.

(56) References Cited

U.S. PATENT DOCUMENTS

| | | | | |
|---|---|---|---|---|
| 2,596,463 A * | 5/1952 | Barthelmes | ................... | 367/36 |
| 4,232,378 A * | 11/1980 | Adams et al. | ................. | 367/36 |
| 4,713,775 A * | 12/1987 | Scott et al. | ..................... | 706/45 |
| 4,802,146 A * | 1/1989 | Moeckel | ...................... | 367/52 |
| 4,802,147 A * | 1/1989 | Moeckel | ...................... | 367/57 |
| 4,894,809 A * | 1/1990 | Moeckel | ...................... | 367/57 |
| 4,924,449 A | 5/1990 | Guigne | | |
| 5,083,297 A * | 1/1992 | Ostrander | .................... | 367/36 |
| 5,555,531 A | 9/1996 | Booth et al. | | |

(Continued)

OTHER PUBLICATIONS

1) International Search Report mailed May 16, 2006 by the International Searching Authority in counterpart PCT application No. PCT/US2005/06643.

*Primary Examiner*—Scott A Hughes
(74) *Attorney, Agent, or Firm*—Abelman, Frayne & Schwab

(57) ABSTRACT

Shallow drilling hazards (44), such as karsts, caves, voids and unconsolidated discontinuities, that can pose significant risks to exploration and development well drilling operations are detected employing seismic refraction data on which a series of attribute analyses are performed, the resulting data being further processed to provide a three-dimensional visualization. Refracted wave raypaths (40, 46, 48) are highly distorted by encountering a karst feature with the occurrence of back-scattering absorption. The resultant energy recorded at the surface receivers (52) is significantly reduced as compared to refracted waves recorded by other receivers (50) where no karsting is present. Multiple refractors are subjected to a relatively simple and rapid processing using commercially available software to track these differences and to map them in the near surface to improve the siting of wells and to alert drilling engineers and crews to the possibility of encountering the hazard.

20 Claims, 31 Drawing Sheets

U.S. PATENT DOCUMENTS

| | | |
|---|---|---|
| 5,671,136 A | 9/1997 | Willhoit, Jr. |
| 5,757,723 A | 5/1998 | Weglein et al. |
| 6,026,913 A * | 2/2000 | Mandal et al. ............... 175/45 |
| 6,473,696 B1 * | 10/2002 | Onyia et al. .................. 702/6 |
| 6,480,118 B1 | 11/2002 | Rao |
| 6,501,703 B2 | 12/2002 | Zhou et al. |
| 6,593,746 B2 | 7/2003 | Stolarczyk |
| RE38,229 E * | 8/2003 | Marfurt et al. ............... 702/16 |
| 6,791,469 B1 * | 9/2004 | Rao et al. ............... 340/853.6 |
| 6,820,010 B1 * | 11/2004 | Sahai et al. ................. 702/18 |
| 6,961,673 B2 * | 11/2005 | Barnes ...................... 702/182 |
| 6,977,866 B2 * | 12/2005 | Huffman et al. ............. 367/73 |
| 2002/0169559 A1 * | 11/2002 | Onyia et al. ................. 702/14 |
| 2004/0093163 A1 * | 5/2004 | Reshef et al. ............... 702/14 |
| 2005/0171700 A1 * | 8/2005 | Dean ........................... 702/16 |

* cited by examiner

PREDICTION OF SHALLOW DRILLING HAZARDS USING SEISMIC REFRACTION DATA

CROSS-REFERENCE TO RELATED APPLICATIONS

This application is based on U.S. provisional Ser. No. 60/548,515, filed on Feb. 26, 2004, which is incorporated herein by reference in its entirety.

FIELD OF THE INVENTION

The invention relates to a method of utilizing three-dimensional land or ocean bottom cable (OBC) seismic data to predict the location of shallow drilling hazards such as karsting and voids in near subsurface formations.

BACKGROUND OF THE INVENTION

Shallow drilling hazards in carbonate formations are well known to present potential problems in exploration and developmental drilling and can represent a significant risk to the exploitation of hydrocarbons. Shallow formation carbonates are subject to the presence of groundwater and dissolution, creating void air spaces (caves) of varying and highly irregular dimensions. Some of these voids collapse totally or partially, while others remain intact. If a drill bit and drill string encounter such a karst feature, there is an immediate loss of circulating fluid, and there also can be a bit drop through the void space of the karst. This can result in the total loss of the well at great expense.

Production three-dimensional seismic data is normally gathered and employed for the imaging of seismic reflection data for targeted and prospective reservoirs. This data is then analyzed by seismic interpreters, sometimes using three-dimensional visualization techniques, to interpret and map these reservoirs for the purpose of locating areas of trapped hydrocarbons for subsequent exploitation by drilling. For example, the seismic reflection data can be displayed in a three-dimensional cube or a portion of a cube on a screen in a map view of the data in the prior art as shown in FIG. 1. However, such displayed reflection data can show little continuity and so cannot aid in detecting shallow drilling hazards.

The oil industry has for some years recognized the desirability, if not the necessity of locating and avoiding shallow drilling hazards. These hazards to drilling are very time-consuming to traverse with the drill bit and therefore expensive, and represent a potential danger to drilling crews. Most industry efforts to solve the problem that have been published and, in some cases patented, are associated with exploration in marine offshore environments. Shallow subsurface voids and the potential for mudslides can endanger the drilling operation. Further problems can be caused by shipwrecks and other man-made obstructions. It is also possible for localized zones of natural gas under pressure to exist in very shallow rock strata that would pose both a drilling risk of blowout, as well as a structural risk to the platform.

In marine exploration and development programs today, it is common for both corporations and governments to require the acquisition of a seismic hazard survey that is usually two dimensional for a planned drilling location. This requirement is particularly appropriate where large and expensive drilling platforms must be built and positioned over an area to be drilled. The sea floor must be able to sustain the forces of drilling equipment and operations. Should failure occur, it would result in the potential loss of the platform and associated equipment, risk the lives of operating personnel and the loss of millions of dollars in capital investment. The environmental risks are obvious and significant. These marine hazards can be detected by the utilization of streamer seismic data and by the careful processing of the signal to preserve the phase and relative amplitudes of the reflected arrivals in the shallow section below the water bottom. Drilling hazards can often be detected using a method such as that described in U.S. Pat. No. 5,555,531, that employs three-dimensional seismic data in a marine environment.

To date, all known efforts to locate these karsted features in seismic land data in carbonate environments have relied on the use of seismic reflection data. The results have been limited or poor. For example, FIG. 2 illustrates a computer screen displaying a two-dimensional visualization of seismic reflection data in accordance with the prior art at a point of lost drilling fluid circulation, with the three vertical lines in the data representing well bores. As shown in FIG. 2, the use of conventional seismic reflection data makes it quite impossible to accurately detect any lost circulation, as the noise of the data overwhelms the few traces occupying each bin of data. While this reflection approach will generally work in a marine environment, it will not work in a high-noise land setting.

Previous attempts to detect shallow hazards include the so-called seismic-while-drilling (SWD) method. The goal was to gain the ability to look ahead of the bit while drilling is underway using the descending drill bit as an acoustic source, and in conjunction with surface-located receivers. For example, in U.S. Pat. No. 6,480,118 a seismic-while-drilling method is described that generates seismic data useful for looking ahead of the drill bit which is employed as the acoustic source. The processed look ahead data is used to maximize the drilling penetration rate based on the selection of more effective drill bits. The method purports to be useful in minimizing the risks of encountering unanticipated drilling hazards. The SWD method suffers the drawback that the well is already positioned and drilling is underway, so that the well might be placed in a disadvantageous location, without any practical alternative but to keep drilling.

A second approach has been to employ reflection seismic data in an effort to map these karsted features. To date, this method has not been entirely successful. The reason for the lack of success is the relatively poor sampling of reflections in the very shallow portion of the seismic prestack record. Absent a very high-resolution survey, which for large drilling programs would be prohibitive in terms of time and cost, there is no apparent method using reflection data that can be improved sufficiently to reliably identify the shallow hazards.

Other proposals and efforts to employ different types of data, such as ground-penetrating radar (GPR) have not proved practical, since penetration into the karsted subsurface is inadequate.

For example, the method disclosed in U.S. Pat. No. 4,924,449 employs reflected energy from a highly specific location using a positional sub-surface transducer array. While useful in marine environments, it is not useful in a land setting.

A survey of the patent literature has not revealed a satisfactory solution to the problem.

U.S. Pat. No. 6,593,746 describes a method for radio-imaging underground structures for coal beds, with subsequent analysis performed using Full-Wave Inversion Code (FWIC). It can be used in mining operations where transmitters and receivers are placed in the passageways of mines, conditions which are not present in oil and gas exploration operation.

U.S. Pat. No. 6,501,703 describes a method utilizing first arrivals of seismic waves that are used to calculate and correct for time statics.

U.S. Pat. No. 5,757,723 describes a method for seismic multiple suppression using an inverse-scattering method for reflection and transmission data only.

U.S. Pat. No. 6,473,696 describes a method for obtaining and using seismic velocity information for the determination of fluid pressures for use in the analysis of fluid flow in reservoirs, basin modeling and fault analysis.

U.S. Pat. No. 5,671,136 describes a process that removes the refraction information present in the data, and then uses the seismic reflection data to define hydrocarbon-bearing strata, aquifers and potential drilling and mining hazards, utilizing visualization.

A method specifically directed toward the detection of drilling hazards in marine environments using high-resolution three-dimensional seismic data based on reflection data that has been processed to retain broad bandwidth is disclosed in U.S. Pat. No. 5,555,531. It employs reflection seismic data analysis identifying mud slides, shipwrecks, salt structures, mud flows and fluid expulsion features in deeper water environments, i.e., water depths of 800 feet or greater.

Seismic data is produced when a seismic compressional acoustic waveform is produced at the surface by a source such as dynamite or a mechanical source, e.g., a device such as that sold under the trademark VibroSeis™. The waveform spreads as a spherical wave propagation into the earth where it is both reflected and transmitted through rock strata in the subsurface. The reflected energy returns to the earth's surface as reflected waves, where it is recorded by receivers, such as geophones, that have been positioned on the surface at predetermined points displaced from the source.

When a source generates a waveform, it spreads in depth (Z direction) and laterally (X and Y directions). When a waveform spreads at a certain angle (the critical angle), it bends or refracts, and travels along a rock interface rather then through it. This portion of the wave energy is returned to the receivers as a refracted wave.

As noted above, in relatively shallow rock strata, karsts can exist. Geologically, they are produced by the dissolution of rock, i.e., the chemical reaction between carbonates and water. These subterranean caves or voids can be highly irregular in shape and size. In the case of larger karsts or as a result of increases in overburden forces, these voids cannot support the weight of the rock strata above and they collapse on themselves. These collapses can be unconsolidated, that is, there remain a series of much smaller karsts; or they can be consolidated, for example, as a result of further collapses.

When a refracted wave travels along a relatively homogeneous rock interface, the waveform will do so at a specific velocity and travel back to the receivers on the surface where they are recorded at a certain time, frequency and amplitude over a predetermined sampling interval. However, when the refracted waveform encounters a void or a heterogeneity in its path, the waveform is disturbed and the resultant amplitude and/or frequency of the wave returned to the receivers is abnormal.

The situation is very different on land, however, although the risks and dangers of near-surface hazards are similar. These include, but are not limited to, the loss of the borehole, damage to well structures and equipment, blow-outs, environmental damage and lost drilling fluid circulation. The adverse effects of an unexpected encounter with shallow drilling hazards can be elucidated as follows:

1. Lost Circulation of Drilling Fluids
    A. Any sudden loss of the circulating drilling fluid incurs both a monetary loss and an increase in mechanical risk to the equipment.
    B. If hazards could be identified prior to drilling, the drilling engineers could plan the mud injection program accordingly, which at present they are unable to do. This would result in improved use of material and monetary savings during drilling.
2. Unexpected Drill Bit Drops
    A. A drop through a void or karst can result in mechanical damage to the drill string and bit.
    B. The drill string can become stuck in the hole, resulting in the loss of the borehole, in which case the entire well must be redrilled at enormous costs in time and money.
3. Personnel Safety Issues
    A. If shallow karsted zones are unknown to drilling personnel, a bit drop can be hazardous to workers on the drilling platform floor.
    B. Under some circumstances, the rig itself can be damaged if the drill string drops through the drilling floor.

The problem with a land environment, particularly one characterized by shallow carbonates and anhydrites, is that using reflection data will not work as it does in the marine environment. The reasons for this include:

1. In normally-acquired seismic data, the survey and dimensions are designed for deeper targets which possess commercial potential for hydrocarbon accumulation. These surveys are therefore not sampled adequately in the spatial domain closest to the earth's surface.

2. Reflection land seismic information in the shallow subsurface (above about 1,000 feet) will be muted in the processing of the data. Later, the data recorded at each time sample will be corrected for normal moveout and stacked to suppress random noise. The problem is that, in these shallow zones, there is usually inadequate sampling in offset to statistically cancel out the noise.

As used herein, the terms reflected waves, reflection data, reflected energy and reflectors can be used interchangeably and synonymously. In addition, as used herein, the terms refracted waves, refracted energy, refraction energy and refractions are to be understood as equivalent terms.

Three-dimensional seismic surveys are designed primarily to image final drilling objectives ranging from 5,000 feet to more than 18,000 feet below the earth's surface. These three-dimensional surveys are not designed for shallow target resolution.

As current practice in the industry is to conduct shallow hazard marine surveys using reflection data searching for shallow gas-charged zones that would present a danger to the location and structural integrity of off-shore drilling platforms. These surveys are two-dimensional seismic profiles and they are routinely performed today due to the economies of scale involved. A two-dimensional seismic profile is several orders of magnitude less expensive than the capital cost of a deep-water drilling platform and the marine survey can significantly reduce the risk of damage to or loss of the platform.

To date, industry efforts have attempted to employ reflection two-dimensional data and visualization of the reflection data in a three-dimensional display to locate shallow hazards in much the same way as marine two-dimensional surveys have been used. However, it has been found that onshore hazard surveys are more problematic, particularly in shallow carbonate sequences due to near-surface effects and the environmental noise contamination of the seismic data.

BRIEF SUMMARY OF THE INVENTION

The method of the invention employs the refraction information recorded during conventional three-dimensional production seismic surveys. The identifiable refractors are separated out and processed to obtain the advantage of the increased spatial sampling. Each refractor, in essence, is processed in a mini-three-dimensional volume, limited in both offset ranges and in time. Each of these "mini-volumes", when processed, is analyzed utilizing a commercially-available three-dimensional visualization software program. Each refractor's time position is correlated to its associated reflection, and this information in time and depth is retained, along with an assessment of the anticipated presence or severity of the karsted features.

The method of the present invention departs from the conventional use of reflection seismic data and instead employs the refraction data that is recorded but conventionally discarded. This greatly enhances spatial sampling. The near-surface effects on each refracted wave arrival are preferably addressed independently, and following additional processing steps, utilizing commercially available software, each refractor is visualized for the presence of karsts and other potentially hazardous features.

For these and other reasons, the present invention employs refraction arrivals, where the sampling is much improved, so as to effectively cancel out random noise. The improvement in the signal-to-noise ratio permits the analysis of the refraction information. Further, as this invention seeks to accurately detect the presence of karsted features such as subsurface voids or caves, refracted waves are ideally suited to this since they propagate along the very rock strata of interest. The use of refraction arrivals with targeted processing of these waveforms in a land environment forms the basis of the method of the invention.

This method of the invention disregards the reflection data entirely and focuses instead on refracted waves in the near surface. The method of the invention targets the source of potential difficulty and dangers involved in drilling for hydrocarbons in carbonate formations where karsting and unconsolidated collapses can occur. The method provides data (1) to alert the drilling engineers to the presence of these hazards; and (2) to permit the siting of wells in the most advantageous locations to avoid any shallow subsurface hazards.

The method of the invention has the advantages of enhancing the economy and safety of drilling in hydrocarbon exploration and recovery by using elements of pre-existing seismic data that are conventionally discarded or muted, processing it in a novel manner and presenting it for interpretation in a form that facilitates identification of karsts and other shallow drilling hazards.

This invention provides a novel process that uses oil exploration technologies in a different manner for a different and specific purpose, e.g., identifying potential drilling problems in the shallow sections and zones where hazards often exist. The analytical tools employed in this novel process are known to those of ordinary skill in the seismic processing and interpretation art, but the process of the invention has not previously been identified or applied by those of ordinary skill in either of these fields.

The primary use of seismic refraction data in the prior art has been for the resolution of time statics caused by spatial velocity variations in the near surface through a variety of well known methods, including tomography. Refraction data are normally discarded for conventional reflection-based seismic data processing.

By comparison, the use of refraction arrivals provides far superior spatial sampling. In the process of the present invention seismic reflection data is discarded, or muted out, and the refraction data is retained for analysis. It should be noted that this particular aspect of the method of the invention is not merely an improvement on earlier methods, but rather, is fundamentally different in its use of refracted waves and refraction energy.

The data utilized in the process of the invention is advantageously the pre-existing production seismic data that was originally developed to explore for hydrocarbon accumulations. However, the method of the invention can also be used with seismic refraction surveys, including patches and cross-spreads.

Processing of the seismic refraction data begins with the identification of the refractor waves, or refractors, and their linear moveout velocities. The refraction data is filtered, time-shifted and corrected for linear moveout (LMO). The filtering can be by time, frequency-wave number filtering (FK), Karhunen-Loewe (KL) data processing, and data-driven techniques. These and other filtering techniques are well known in the industry and are considered standard techniques.

Each refractor is then separated. Datum or elevation statics are computed and applied, and residual statics are run on each refractor separately. The latter step can be performed before the separation, but superior results have been obtained on separated refractor data. The result of these steps is a plurality of refraction "mini-volumes", which are then binned and stacked. These stacked refraction mini-volumes can then be subjected to post-stack signal processing, if conditions require. Conditions requiring post-stack signal processing can include severe coherent noise generated by surface environmental sources, such as motor vehicles on a highway, pumps, aircraft, pipelines and even strong winds. Suitable software for use in this phase of the inventive method is available from Paradigm Geophysical under the trademark Disco/Focus™.

The refraction mini-volumes are then loaded into a commercially available three-dimensional visualization computer software program application for analysis. Suitable visualization programs are sold by Paradigm Geophysical under the trademarks VoxelGeo™ and GeoProbe™; other programs include Earth Cube™ and Geo Viz™. These program applications provide the analyst with screen displays from which the analyst plots existing or planned well locations. The mini-volumes are then analyzed separately. The next step is to generate a semblance cube from each refractor mini-cube/volume.

The time image of each refractor will normally vary spatially with time and if the data quality allows, these surfaces can be flattened to allow the analysis to proceed in the time-slice domain with great effect. The effect of time slice analysis is to actually see the karsted features in a map view as a function of time. In cases of good overall data quality, this analysis mode provides the seismic interpreters and drilling engineers with estimates of the volume of the karsted void. In the case of an unconsolidated collapsed feature the same visual effect has been observed.

In the event that the data is of relatively poor quality, the analysis can still proceed advantageously by conducting it in X/Y-space, using inlines and cross-lines, or traverses chosen by the analyst.

The basic approach to the method of the invention is to analyze each refractor where data from existing wells showed no events in their drilling histories of lost circulation, bit drops, or other such problems. These points will show an undisturbed refractor amplitude/frequency/semblance response. The same analysis is conducted for problem wells in order to establish a simple and straight-forward calibration of the data. The aforementioned semblance volumes are employed for the purpose of confirming observations seen on the amplitude/time minivolumes. In the case of very poor quality data, the semblance volumes can be very useful in the performing analysis.

Proposed well sites are then plotted in the visualization application and the corresponding refractor amplitude/frequency responses are noted. Depth and/or time correlations with reflection data are then carried out.

The results of these analyses are communicated to the drilling engineers to enable them to make any necessary alterations to the location of planned wells. In the instance of drilling in an established field with fixed well spacings, relocation of the well site might not be possible. In such a case, the drilling engineers can plan the well drilling program with the identified hazards in mind so that appropriate changes can be made to mud composition and weight, drilling rates and other drilling parameters.

From the above description, it will be understood that the novel process employs conventional seismic data in a new way to address the long-standing problem of mechanical drilling risks in shallow depths of less than 3,000 feet utilizing the source-to-receiver offset not normally used in the industry for detecting shallow drilling hazards. The method of the invention utilizes refraction information in a new, unexpected and unconventional manner for a new purpose.

In some locations where there are few wells in the geographic area under investigation, calibrating the processed refracted wave seismic data to well histories will not be possible. Noise and static are also factors that are normally encountered, particularly in areas where surface infrastructure is built up, such as highways, pipelines, towns and the like. Under such circumstances where calibration is difficult, the maximum semblance and amplitudes are located, and it is assumed that these are areas of potentially minimal, but not non-existent, drilling risks. Static and noise factors are foreseeable and their effects are minimized by the use of conventional signal processing techniques that are well known in the art.

As will also be understood by one of ordinary skill in the art, where karsts and unconsolidated collapses are identified in carbonate strata and these hazardous features cannot be avoided due to well spacing constraints, their identification will enable the drilling engineers and staff to plan accordingly to minimize any adverse consequences during drilling operations.

The process of the invention is advantageously employed to identify large karsts and unconsolidated collapsed features in the subsurface prior to drilling and in the selection of well sites that will obviate or minimize the drilling risks of lost circulation. The invention can also be used to identify very shallow, highly-charged gas zones. Further advantages include providing the drilling engineers with information that enables them to more intelligently and efficiently plan drilling to reduce costs. Finally, by giving the engineers prior warning of these hazards, drilling plans can be altered to enhance the safety profile of drilling through any hazardous zones that cannot otherwise be avoided.

This invention is applicable to the drilling of wells that employ a drill string and bit, including the drilling of wells for hydrocarbons, water wells and observation/injector wells. The invention can be used for onshore or land areas, for transition zones and in shallow water where an ocean bottom cable (OBC) is employed. The invention is useful with any seismic source/receiver configuration or type that is consistent with the above methods, so long as refraction data has been recorded. The operational depth at which the process is applicable is limited only by the recorded offset range in the three-dimensional seismic survey.

BRIEF DESCRIPTION OF THE DRAWINGS

Preferred embodiments of the invention are described hereinbelow with reference to the drawings wherein.

DETAILED DESCRIPTION OF THE INVENTION

Figure 1:
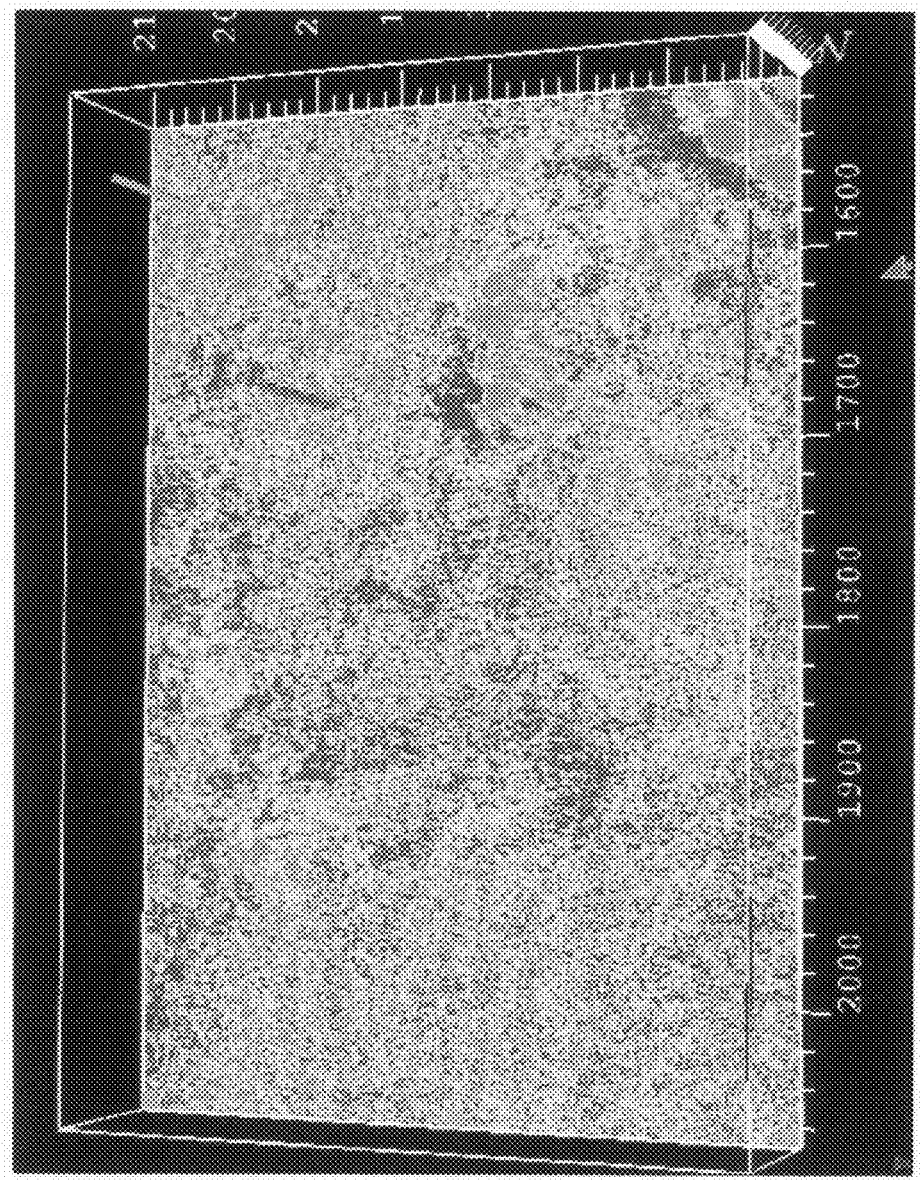
FIG. 1 illustrates a map view in the prior art of reflection seismic data.
Figure 2:
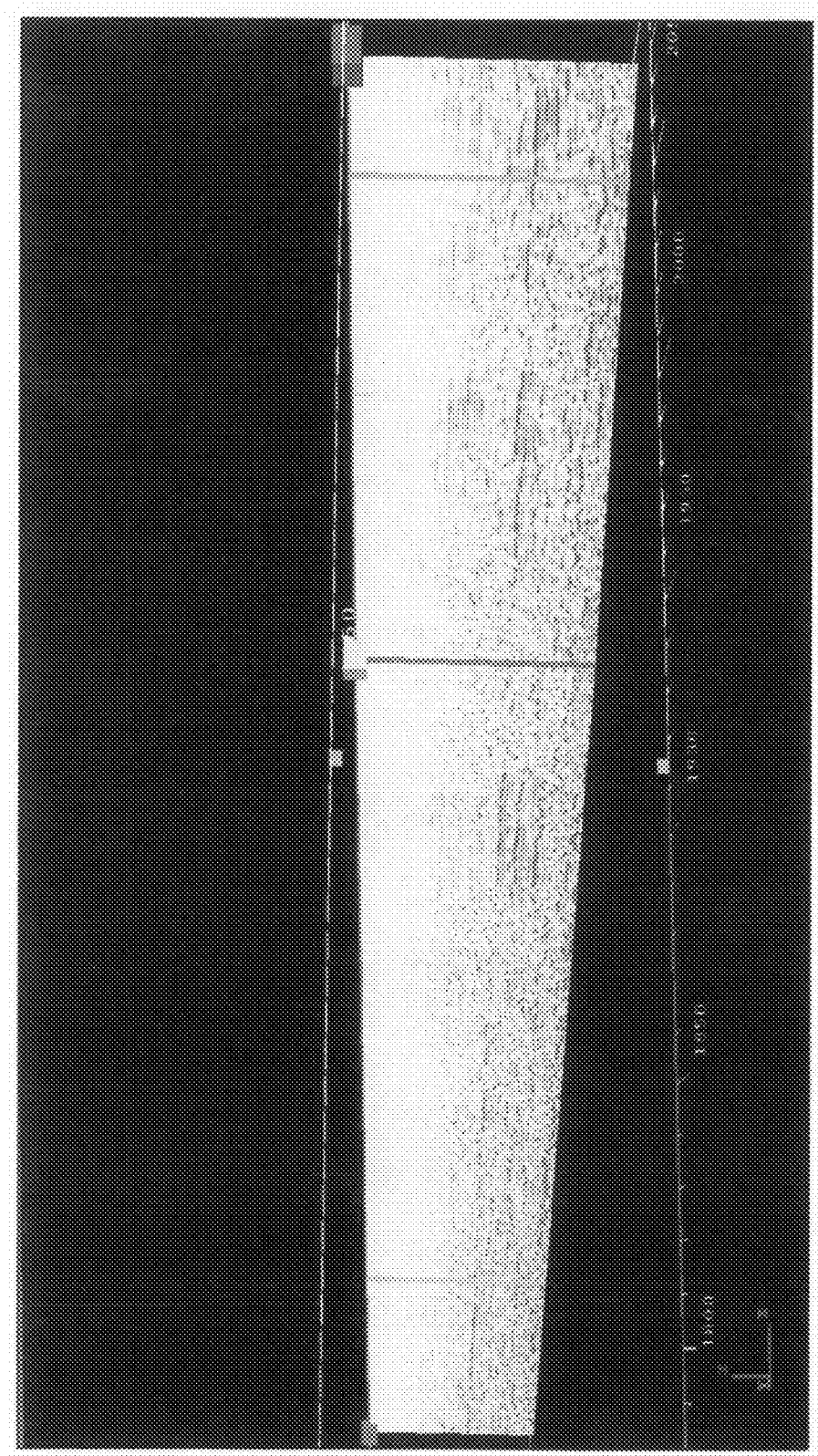
FIG. 2 illustrates a conventional display of reflection seismic data in the prior art.
Figure 3:
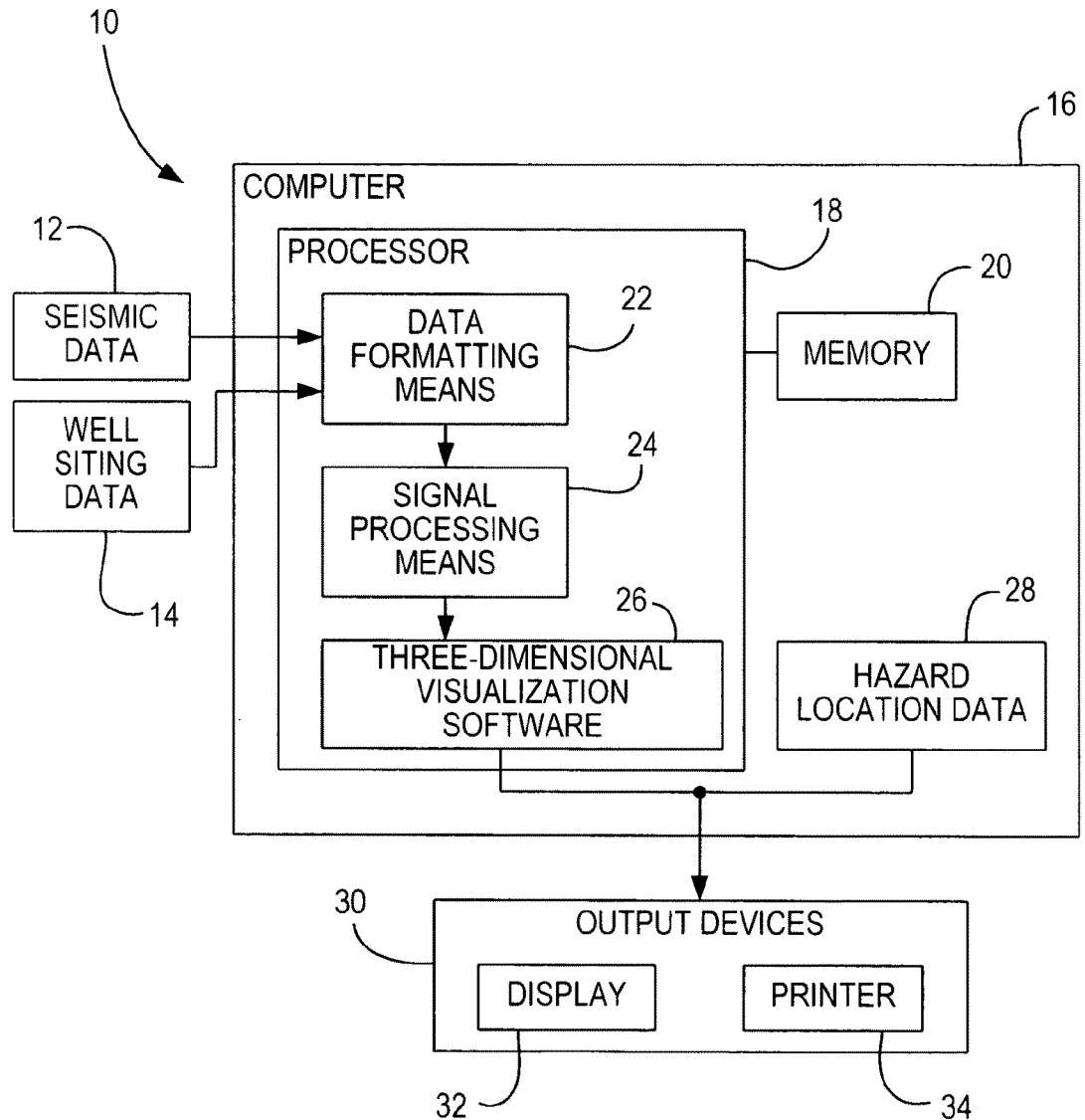
FIG. 3 illustrates a block diagram of the system of the present invention.

Referring to FIGS. 3-31, a system 10 and method are disclosed for predicting and defining shallow drilling hazards using three-dimensional production seismic data. As shown in FIG. 3, the system 10 is computer-based for receiving seismic data 12 and well-siting data 14 and for executing software for visualizing the data and for determining the location of shallow drilling hazards using the means and methods described herein in connection with FIGS. 4-31. These are superior to the prior art results mentioned above and as illustrated on FIGS. 1 and 2.

Referring to FIG. 3, the system 10 includes a computer 16 having a processor 18 for receiving the seismic data 12 and the well siting data 14 and for storing such data 12, 14 in a memory 20. The computer 16 can be implemented, for example, on a Sun Microsystems™ computer operating the 64-bit Solaris 9™ operating system.

The processor 18 includes data formatting means 22 for formatting the input data 12, 14 for processing by signal processing means 24. The signal processing means 24 performs the methods of the present invention as described herein to generate three-dimensional data for use by three-dimensional visualization software 26 to generate a three-dimensional map of the production seismic data, and to generate hazard location data 28 to identify the location of shallow drilling hazards. The three-dimensional map and the hazard location data 28 are output to at least one output device 30, which can include a display 32 and/or a printer 34 for outputting to the user the three-dimensional map and/or portions or cross-sectional cuttings thereof to facilitate the viewing of the seismic data and any identified shallow drilling hazards, which can be located by coordinates and text messages in the outputted hazard location data 28.

Figure 4:
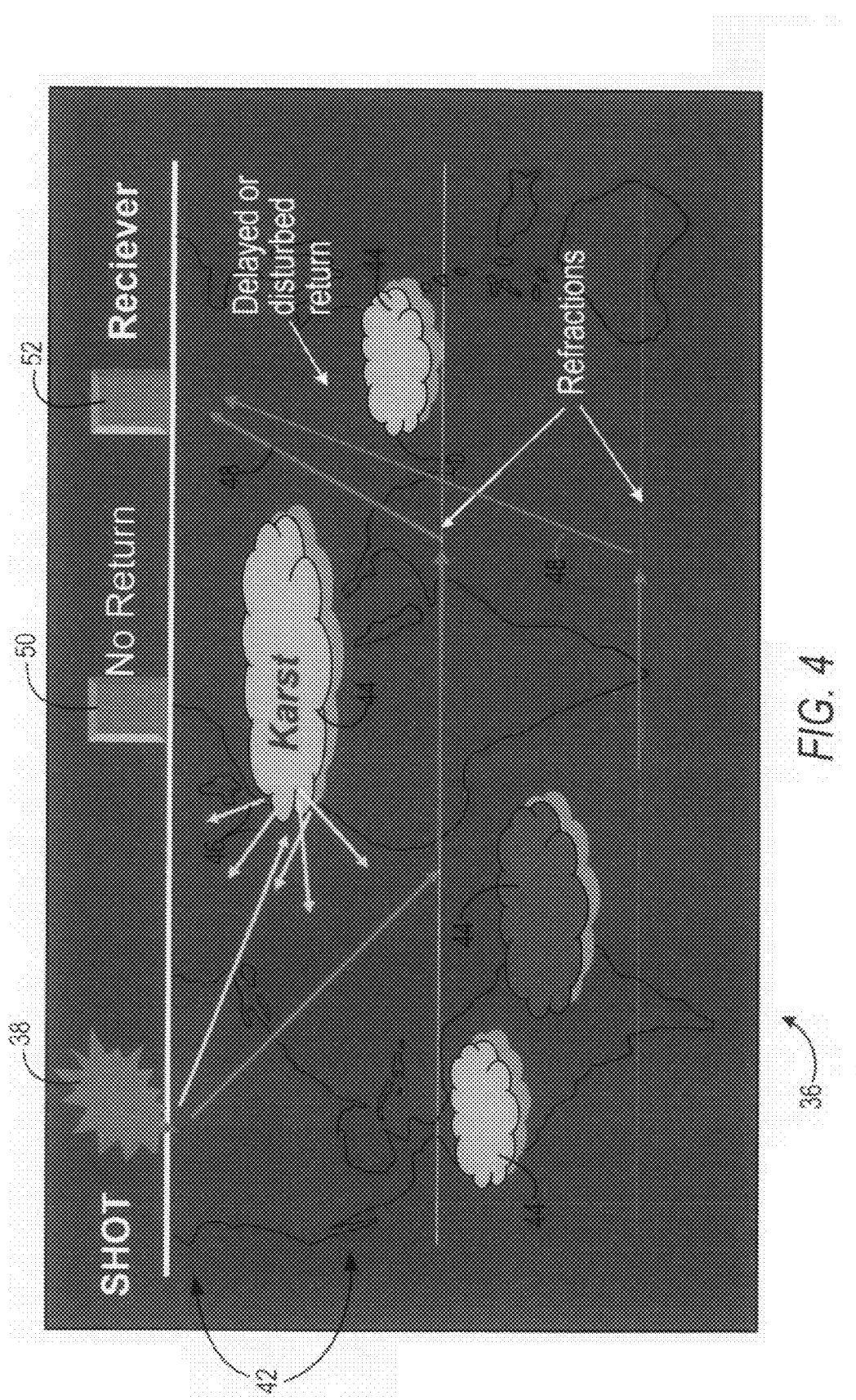
FIG. 4 illustrates a side view of a conceptual framework of operation of the present invention.
Figure 5:
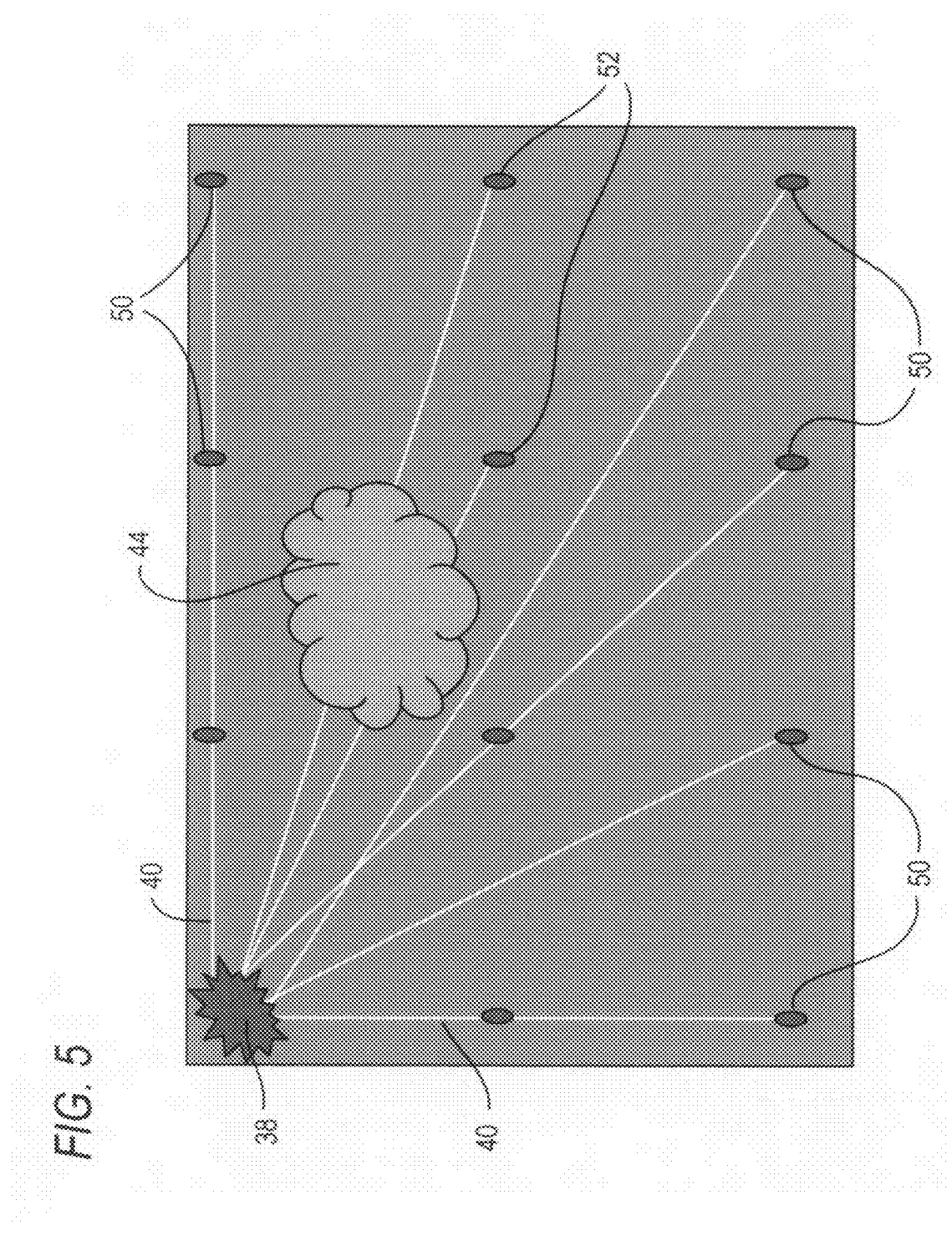
FIG. 5 illustrates a top view of a conceptual framework of operation of the present invention.

In opposition to the prior art which utilizes reflection data, the method of the present invention employs the refraction information recorded during conventional three-dimensional production seismic surveys. As shown in FIG. 4, in a conceptual framework 36 of operation of the present invention, a shot or explosive 38 is detonated which sends seismic waves 40 into the ground, including the shallow drilling region 42. When a refracted wave broaches a critical angle, it travels along an interface where a positive impedance contrast exists between underground layers of material.

A karst 44 or other anomalous regions in the shallow drilling region 42 will generate backscattered and/or disturbed refracted energy 46, while the shallow drilling region 42 will generate a normal refracted wave 48, since in layers of material, if homogeneous with no karsting or unconsolidated collapses, the normal refracted wave 48 will return to the surface to be normally recorded by a plurality of receivers 50, 52.

If a void space or karst 44 is encountered, a distortion of the waveform of the seismic waves 40 will occur which depends on the size of the heterogeneity of the underground region including the karst 44, as well as its composition, such as being a subterranean cave or an unconsolidated collapse feature. The waveform of the seismic waves 40 can undergo backscattering to generate the refracted energy 46, which would also distort the return of the seismic waves 40 to the receivers on the surface 50, 52.

The plurality of receivers 50, 52 detect the refracted wave characteristics, including the direction, intensity, location, and time of receipt of the refracted waves 46, 48. A first receiver 50 can possibly detect no return waves, while a second receiver 52 detects one or more of the waves 46, 48, such as the normal refracted wave 48. Analysis of the refracted wave characteristics determines the presence of any karst 44 affecting the seismic waves 40 and generating the refracted wave 46.

The identifiable refractors are separated out and processed to obtain the advantage of the increased spatial sampling. Each refractor, in essence, is processed in a mini-three-dimensional volume, limited in both offset ranges and in time. Each of these "mini-volumes", when processed, is analyzed utilizing a commercially-available three-dimensional visualization software program 26.

Each refractor's time position is correlated to its associated reflection, and this information in time and depth is retained, along with an assessment of the anticipated presence or severity of the karsted features. In a conceptual framework of the operation of the present invention shown in FIG. 5 from a top view, a plurality of receivers 50, 52 are distributed in a two-dimensional grid on the surface, for receiving refracted waves 40 generated by a shot or explosive 38, with possibly a number of such waves 40 incident on the karst 44. In this example, some receivers 50 detect normally refracted waves and/or no waves refracted by the karst 44, while other receivers 52 detect distorted waves affected by the karst 44.

Normally refracted waves which do not encounter a void or karst 44 will be recorded by the receivers 50 with a predictable amplitude, frequency, and phase at the receivers 50, which will not be the case for parts of the waveform which encounter the karst 44 and which are detected by the receivers 52. It is possible and even probable that at least portions of the waveform 40 from the shot 38 could impinge upon a void or karst 44, could be subjected to backscattering, as shown in FIG. 4, and could be recorded at a nearby receiver. However, such backscattered waves 40 will be detected along a longer raypath than expected and hence will be recorded at a greater time value than expected.

Figure 6:
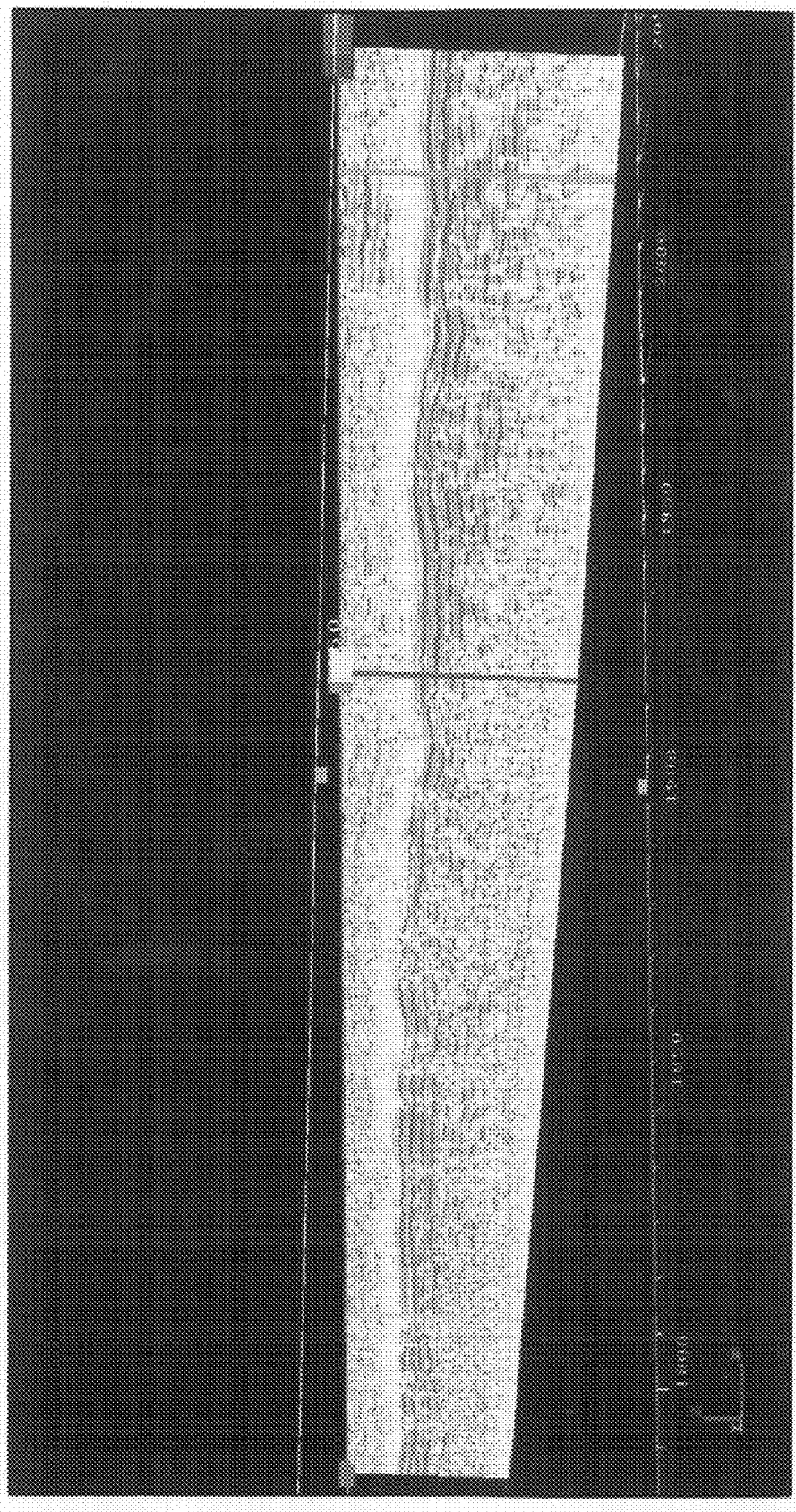
FIG. 6 illustrates a display of a mid-range of offset traces.

Such refractor data from the plurality of receivers 50, 52 can be displayed on the display 32 in a screen view as shown in FIG. 6, in which a mid-range of offset traces are displayed, with the vertical lines representing well bores. FIG. 6 demonstrates that a significant improvement in continuity and visualization occurs using the present invention.

Figure 7:
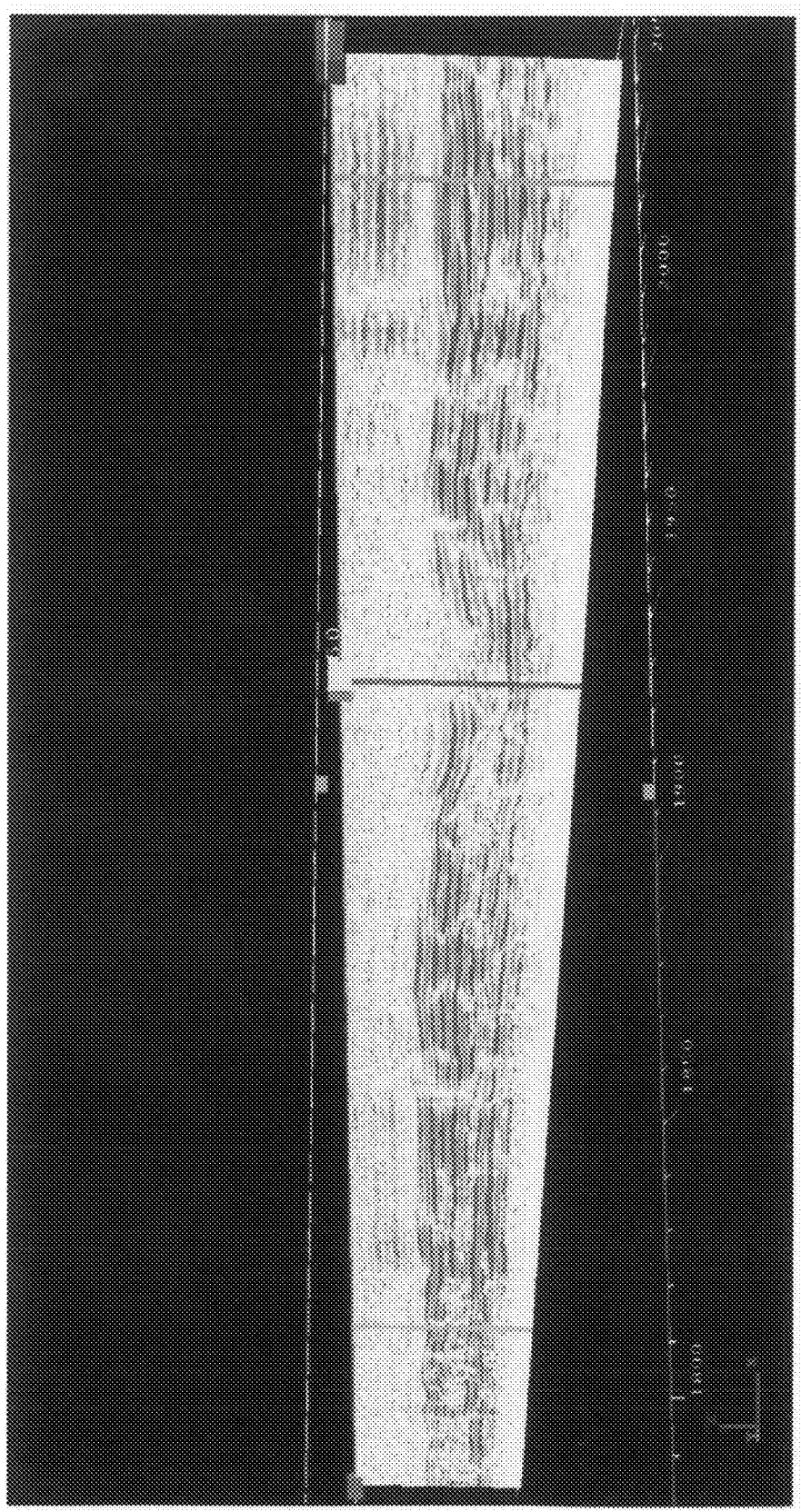
FIG. 7 illustrates a display of refractor data processed in stacks of data with far offset traces.

In another example display screen shown in FIG. 7, the refractor data can be processed in stacks of data with far offset traces, which enhance the visualization of problem zones. Where amplitudes in the production seismic data are either disturbed or missing, the user viewing the three-dimensional visualization maps and/or portions or cross-sectional cuttings thereof can more easily anticipate problem areas having an increased probability of the presence of shallow drilling hazards.

The method of the present invention departs from the conventional use of reflection seismic data and instead employs the refraction data that is recorded but conventionally discarded. This greatly enhances spatial sampling. The near-surface effects on each refracted wave arrival are preferably addressed independently, and following additional processing steps, utilizing commercially available software, each refractor is visualized for the presence of karsts and other potentially hazardous features.

For these and other reasons, the signal processing means 24 of the present invention employs refraction arrivals, where the sampling is much improved, so as to effectively cancel out random noise. The improvement in the signal-to-noise ratio permits the analysis of the refraction information. Further, as this invention seeks to accurately detect the presence of karsted features such as subsurface voids or caves, refracted waves are ideally suited to this since they propagate along the very rock strata of interest. The use of refraction arrivals with targeted processing of these waveforms in a land environment forms the basis of the method of the invention.

This method of the invention disregards the reflection data entirely and focuses instead on refracted waves in the near surface. The method of the invention targets the source of potential difficulty and dangers involved in drilling for hydrocarbons in carbonate formations where karsting and unconsolidated collapses can occur. The method provides data (1) to alert the drilling engineers to the presence of these hazards; and (2) to permit the siting of wells in the most advantageous locations to avoid any shallow subsurface hazards.

The method of the invention has the advantages of enhancing the economy and safety of drilling in hydrocarbon exploration and recovery by using elements of pre-existing seismic data that are conventionally discarded or muted, processing it in a novel manner and presenting it for interpretation in a form that facilitates identification of karsts and other shallow drilling hazards.

This invention provides a novel process that uses oil exploration technologies in a different manner for a different and specific purpose, e.g., identifying potential drilling problems in the shallow sections and zones where hazards often exist. The analytical tools employed in this novel process are known to those of ordinary skill in the seismic processing and interpretation art, but the process of the invention has not previously been identified or applied by those of ordinary skill in either of these fields.

The primary use of seismic refraction data in the prior art has been for the resolution of time statics caused by spatial velocity variations in the near surface through a variety of well known methods, including tomography. Refraction data are normally discarded for conventional reflection-based seismic data processing.

By comparison, the use of refraction arrivals provides far superior spatial sampling. In the process of the present invention seismic reflection data is discarded, or muted out, and the refraction data is retained for analysis. It should be noted that this particular aspect of the method of the invention is not merely an improvement on earlier methods, but rather, is fundamentally different in its use of refracted waves and refraction energy.

The data utilized in the process of the invention is advantageously the pre-existing production seismic data that was originally developed to explore for hydrocarbon accumulations. However, the method of the invention can also be used with seismic refraction surveys, including patches and cross-spreads.

Processing of the seismic refraction data by the signal processing means 24 begins with the identification of the refractor waves, or refractors, and their linear moveout velocities. The refraction data is filtered, time-shifted and corrected for linear moveout (LMO). The filtering can be by time, frequency-wave number filtering (FK), Karhunen-Loewe (KL) data processing, and data-driven techniques. These and other filtering techniques are well known in the industry and are considered standard techniques.

Each refractor is then separated. Datum or elevation statics are computed and applied, and residual statics are run on each refractor separately. The latter step can be performed before the separation, but superior results have been obtained on separated refractor data. The result of these steps is a plurality of refraction "mini-volumes", which are then binned and stacked. These stacked refraction mini-volumes can then be subjected to post-stack signal processing, if conditions require. Conditions requiring post-stack signal processing can include severe coherent noise generated by surface environmental sources, such as motor vehicles on a highway, pumps, aircraft, pipelines and even strong winds. Suitable software for use in this phase of the inventive method is available from Paradigm Geophysical under the trademark Disco/Focus™.

The refraction mini-volumes are then loaded into a commercially available three-dimensional visualization computer software program application as the software 26 used by the computer 16 for analysis. Suitable visualization programs are sold under the trademarks VoxelGeo™ and GeoProbe™; other programs include Earth Cube and Geo Viz. These program applications provide the analyst with screen displays on the display 32 from which the analyst plots existing or planned well locations. The mini-volumes are then analyzed separately. The next step is to generate a semblance cube from each refractor mini-cube/volume.

The time image of each refractor will normally vary spatially with time and if the data quality allows, these surfaces can be flattened to allow the analysis to proceed in the time-slice domain with great effect. The effect of time slice analysis is to actually see the karsted features in a map view as a function of time. In cases of good overall data quality, this analysis mode provides the seismic interpreters and drilling engineers with estimates of the volume of the karsted void. In the case of an unconsolidated collapsed feature the same visual effect has been observed.

In the event that the data is of relatively poor quality, the analysis can still proceed advantageously by conducting it in X/Y-space, using inlines and cross-lines, or traverses chosen by the analyst.

The basic approach to the method of the invention is to analyze each refractor where data from existing wells showed no events in their drilling histories of lost circulation, bit drops, or other such problems. These points will show an undisturbed refractor amplitude/frequency/semblance response. The same analysis is conducted for problem wells in order to establish a simple and straight-forward calibration of the data. The aforementioned semblance volumes are employed for the purpose of confirming observations seen on the amplitude/time mini-volumes. In the case of very poor quality data, the semblance volumes can be very useful in the performing analysis.

Proposed well sites are then inputted as well siting data 14 which are plotted in the visualization application 26, and the corresponding refractor amplitude/frequency responses are noted. Depth and/or time correlations with reflection data are then carried out.

The results of these analyses are communicated to the drilling engineers as a three-dimensional map generated by the three-dimensional visualization software 26 and/or by the hazard location data 28, which are output by the at least one output device 30 to enable the drilling engineers to make any necessary alterations to the location of planned wells in the well siting data 14. In the instance of drilling in an established field with fixed well spacings, relocation of the well site might not be possible. In such a case, the drilling engineers can plan the well drilling program with the identified hazards in mind so that appropriate changes can be made to mud composition and weight, drilling rates and other drilling parameters.

From the above description, it will be understood that the novel process employs conventional seismic data in a new way to address the long-standing problem of mechanical drilling risks in shallow depths of less than 3,000 feet utilizing the source-to-receiver offset not normally used in the industry for detecting shallow drilling hazards. The method of the invention utilizes refraction information in a new, unexpected and unconventional manner for a new purpose.

In some locations where there are few wells in the geographic area under investigation, calibrating the processed refracted wave seismic data to well histories will not be possible. Noise and static are also factors that are normally encountered, particularly in areas where surface infrastructure is built up, such as highways, pipelines, towns and the like. Under such circumstances where calibration is difficult, the maximum semblance and amplitudes are located, and it is assumed that these are areas of potentially minimal, but not non-existent, drilling risks. Static and noise factors are foreseeable and their effects are minimized by the use of conventional signal processing techniques that are well known in the art.

As will also be understood by one of ordinary skill in the art, where karsts and unconsolidated collapses are identified in carbonate strata and these hazardous features cannot be avoided due to well spacing constraints, their identification will enable the drilling engineers and staff to plan accordingly to minimize any adverse consequences during drilling operations.

The process of the invention is advantageously employed to identify large karsts and unconsolidated collapsed features in the subsurface prior to drilling and in the selection of well sites that will obviate or minimize the drilling risks of lost circulation. The invention can also be used to identify very shallow, highly-charged gas zones. Further advantages include providing the drilling engineers with information that enables them to more intelligently and efficiently plan drilling to reduce costs. Finally, by giving the engineers prior warning of these hazards, drilling plans can be altered to enhance the safety profile of drilling through any hazardous zones that cannot otherwise be avoided.

This invention is applicable to the drilling of wells that employ a drill string and bit, including the drilling of wells for hydrocarbons, water wells and observation/injector wells. The invention can be used for onshore or land areas, for transition zones and in shallow water where an ocean bottom cable (OBC) is employed. The invention is useful with any seismic source/receiver configuration or type that is consistent with the above methods, so long as refraction data has been recorded. The operational depth at which the process is applicable is limited only by the recorded offset range in the three-dimensional seismic survey.

Figure 8:
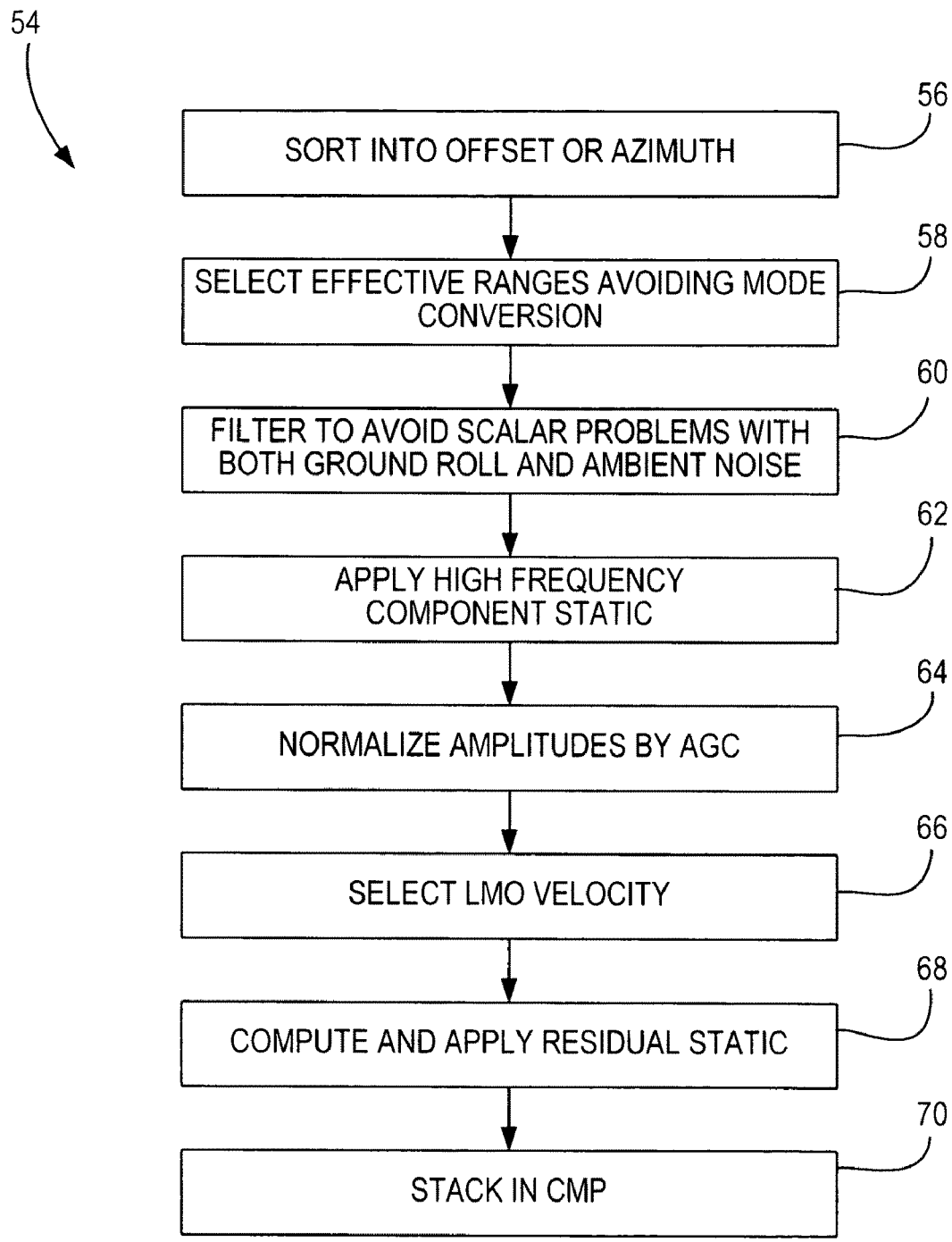
FIG. 8 illustrates a flowchart of a general method of operation of the present invention.
Figure 9:
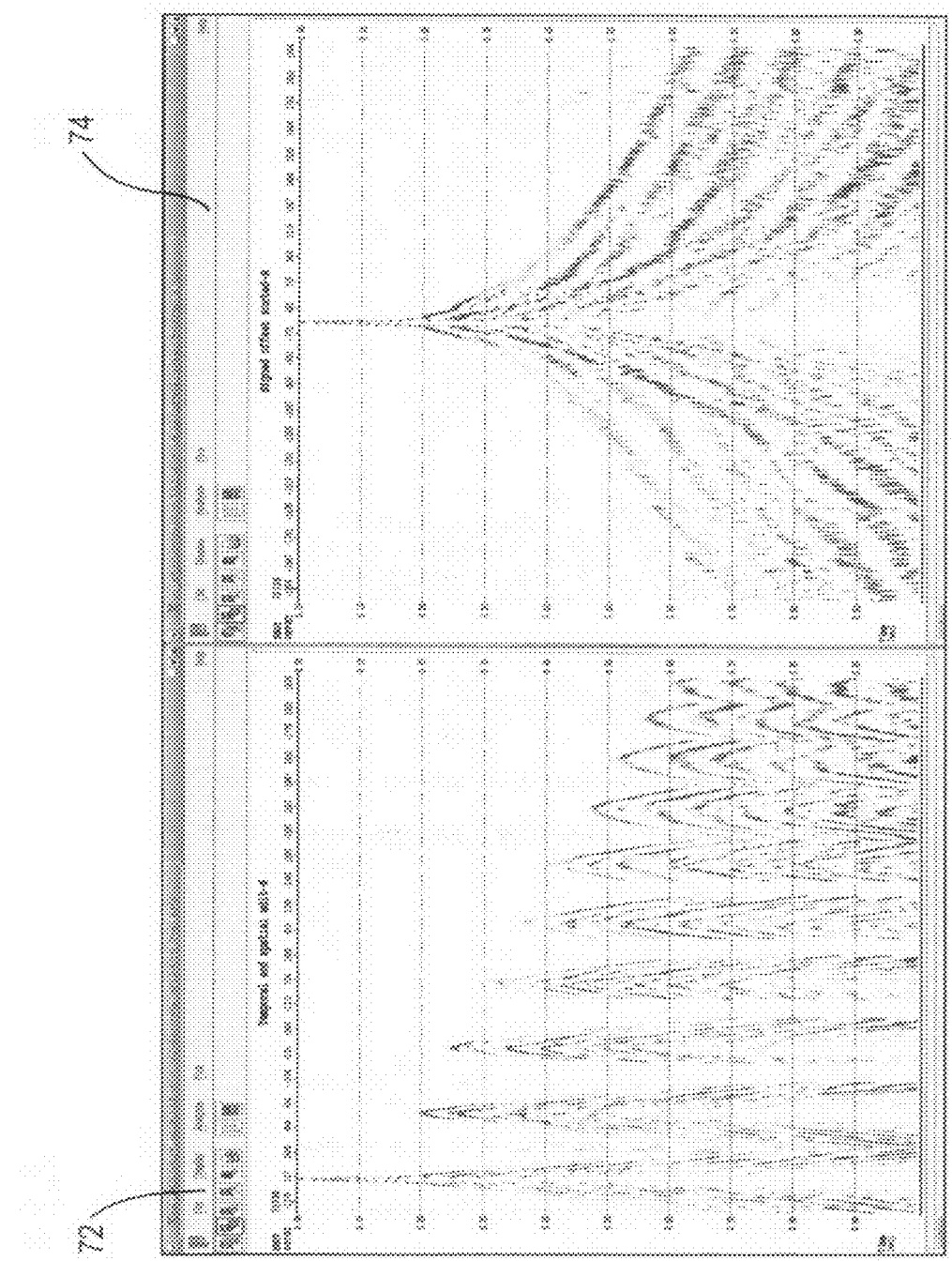
FIG. 9 illustrates a screen display of seismic data sorted into signed offset or azimuth data.
Figure 10:
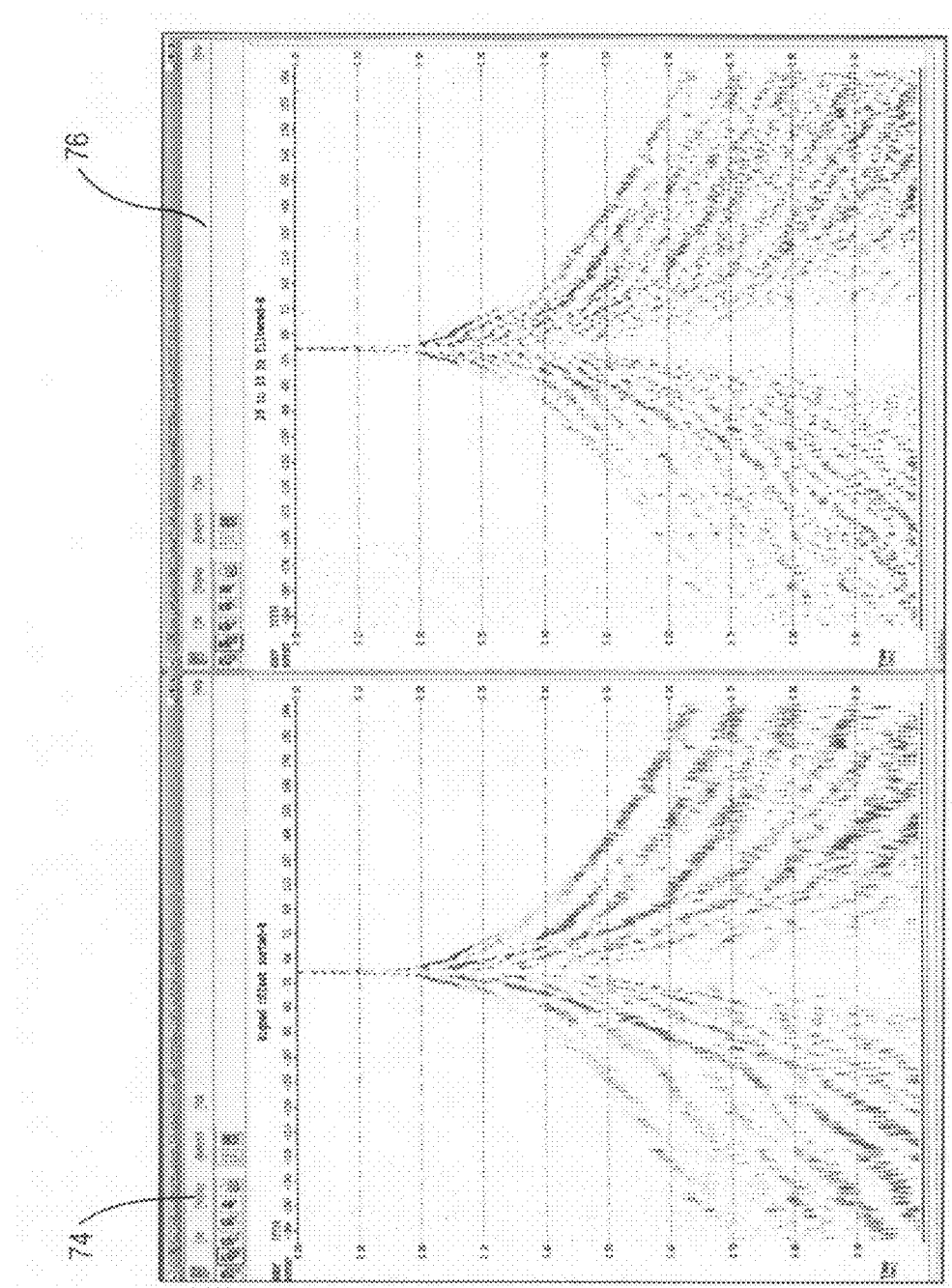
FIG. 10 illustrates application of a bandpass filter to the sorted data in FIG. 9.
Figure 11:
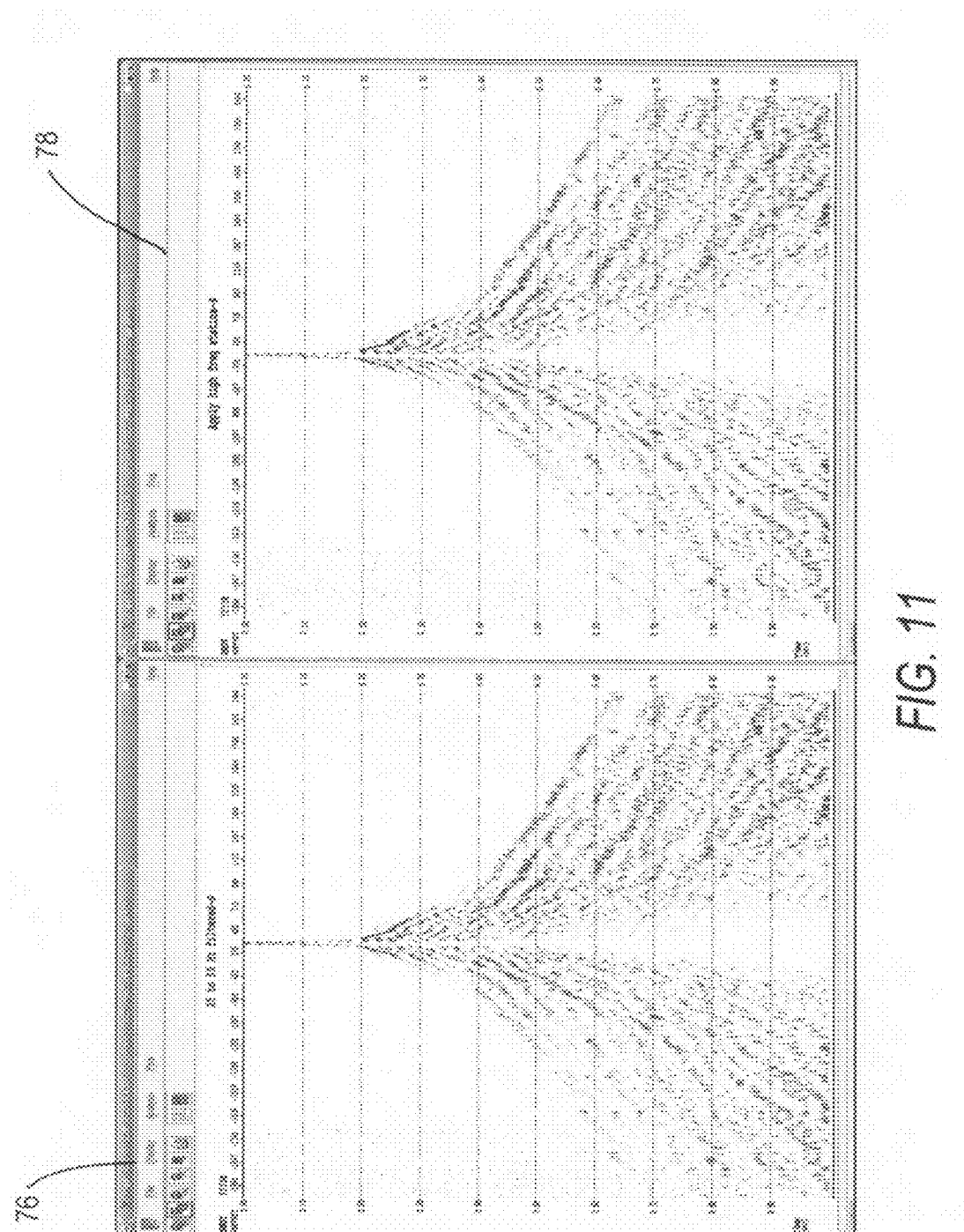
FIG. 11 illustrates application of an elevation and/or high frequency component static to the filtered data of FIG. 10.

Referring to FIG. 8 in conjunction with FIGS. 9-14, the present invention uses the signal processing means 24 to perform a general method 54 of operation of the invention in order to reduce the record length of the input seismic data 12 to be sorted into signed offset or azimuth data in step 56 of FIG. 8, as shown in the screen displays in FIG. 9. In the example left screen 72 in FIG. 9, the deeper data is removed to reduce the record length, and in the example right screen 74 in FIG. 9, the data is sorted according to a signed offset. The method can also select effective ranges of the data to be processed in step 58 of FIG. 8 in order to avoid mode conversion and to focus the signal processing means 24 on the most relevant data.

The method then filters the sorted data in step 60 to avoid scalar problems with both ground roll and ambient noise. In an example screen 76 shown in FIG. 10, a bandpass filter is applied to the sorted data in screen 74. The method then applies a high frequency component static in step 62 to the filtered data, for example, as shown in the screen 78 in FIG. 11 in which an elevation and/or high frequency component static is applied.

Figure 12:
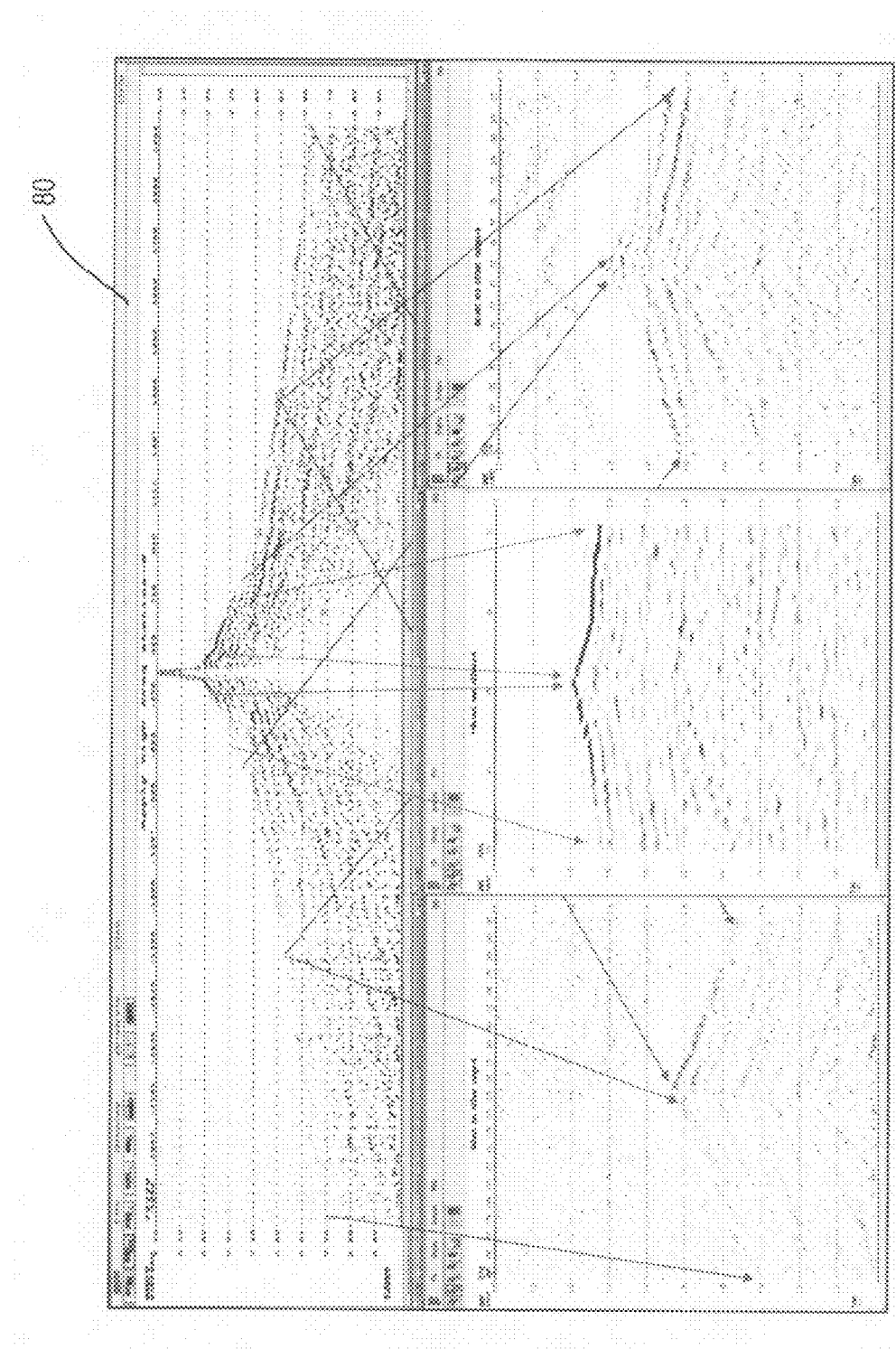
FIG. 12 illustrates normalization of the processed data of FIG. 11 by automatic gain control.

The amplitudes of the processed data are then normalized in step 64 by automatic gain control (AGC), as shown in FIG. 12, by which offset ranges of the data are picked and extracted according to their linear move out (LMO) velocities. In a preferred embodiment, a set of refractor velocities and/or offset ranges is determined, for example, in step 58 as shown in the example screen 80 in FIG. 12, for use in step 64 such that the refractor velocities and/or offset ranges are spatially stable. If such refractor velocities and/or offset ranges change, such changes are accounted for in the normalization process in step 64 using data interpolation.

Known methods of correcting for the LMO and controlling the spatial interpolation can be used, for example, by utilizing the commercially available Paradigm Geophysical software available under the trademark Disco/Focus™.

Figure 13:
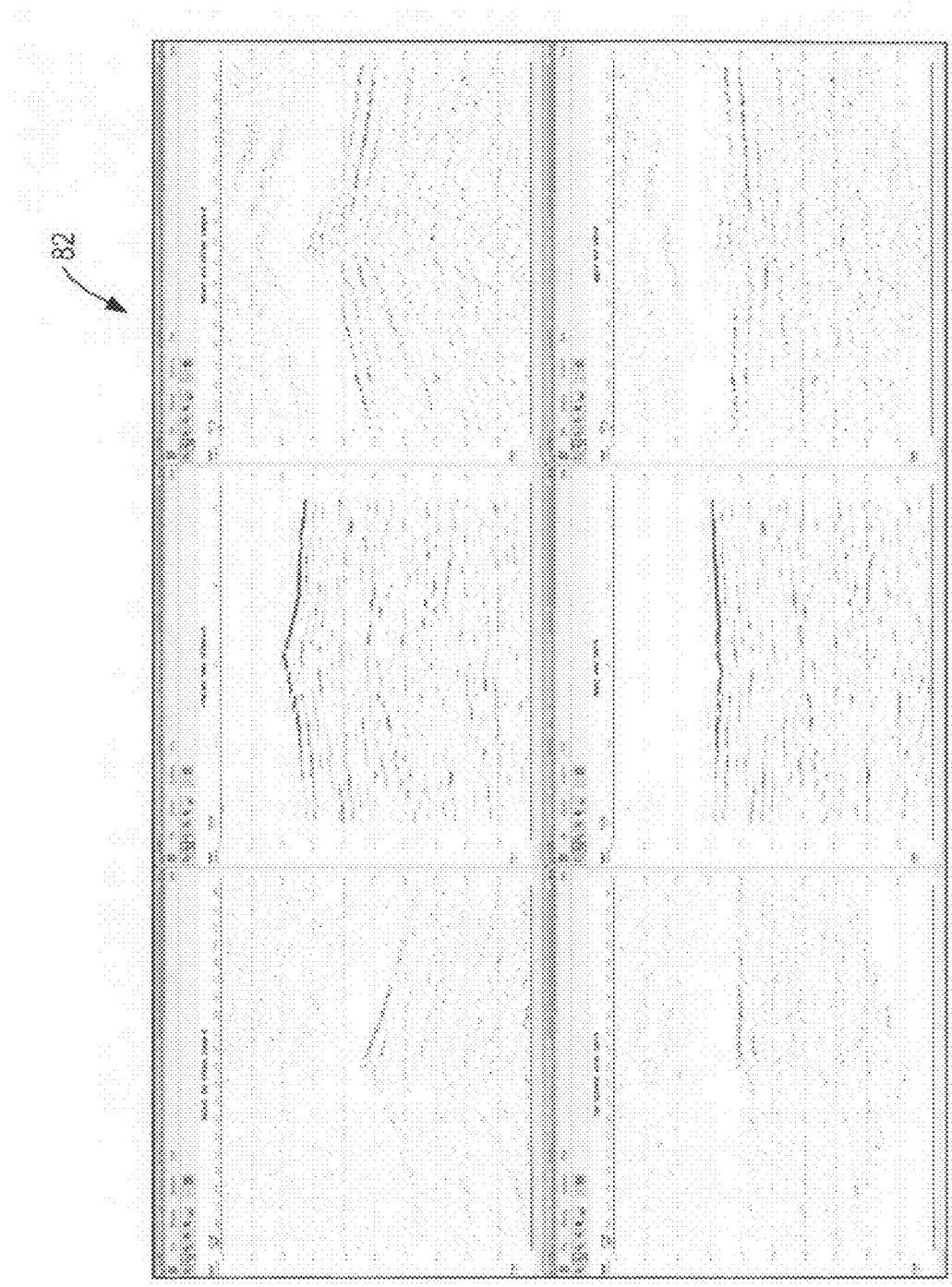
FIG. 13 illustrates offsetting of the data ranges of the normalized amplitudes of FIG. 12 using a bulk data shift.

The method then offsets the data ranges of the normalized amplitudes using a bulk data shift, for example, a 200 ms bulk shift, and the method selects an LMO velocity and/or a static in step 66 which is applied to each refraction dataset as shown in the example screens 82 in FIG. 13.

Figure 14:
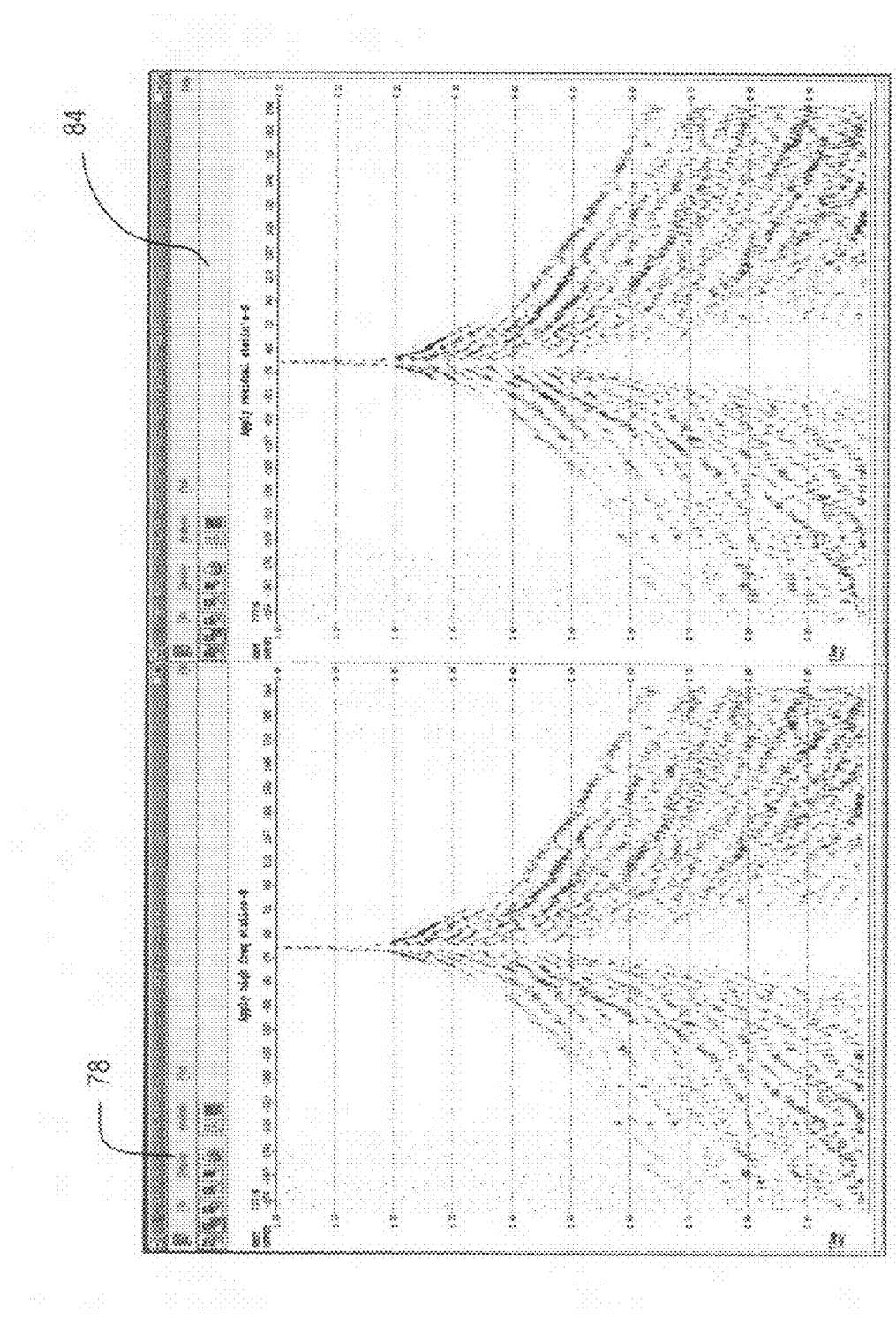
FIG. 14 illustrates application of a residual static for each offset range of data in FIG. 13.

The method then computes and applies a residual static for each offset range in step 68, as shown in the example screen 84 in FIG. 14. In performing step 68, residual statics are computed separately for each refractor wave, and applied to the data processed in step 66. Appropriate quality control steps can also be performed during step 68 to insure accuracy in the processing of the data. The processed data can be stored in step 70 in the memory 20 in a stack according to common midpoint (CMP) values of the data. Such processed data is outputted to the three-dimensional visualization software 26 for generating a three-dimensional map based on the seismic data including the refracted waves.

Figure 15:
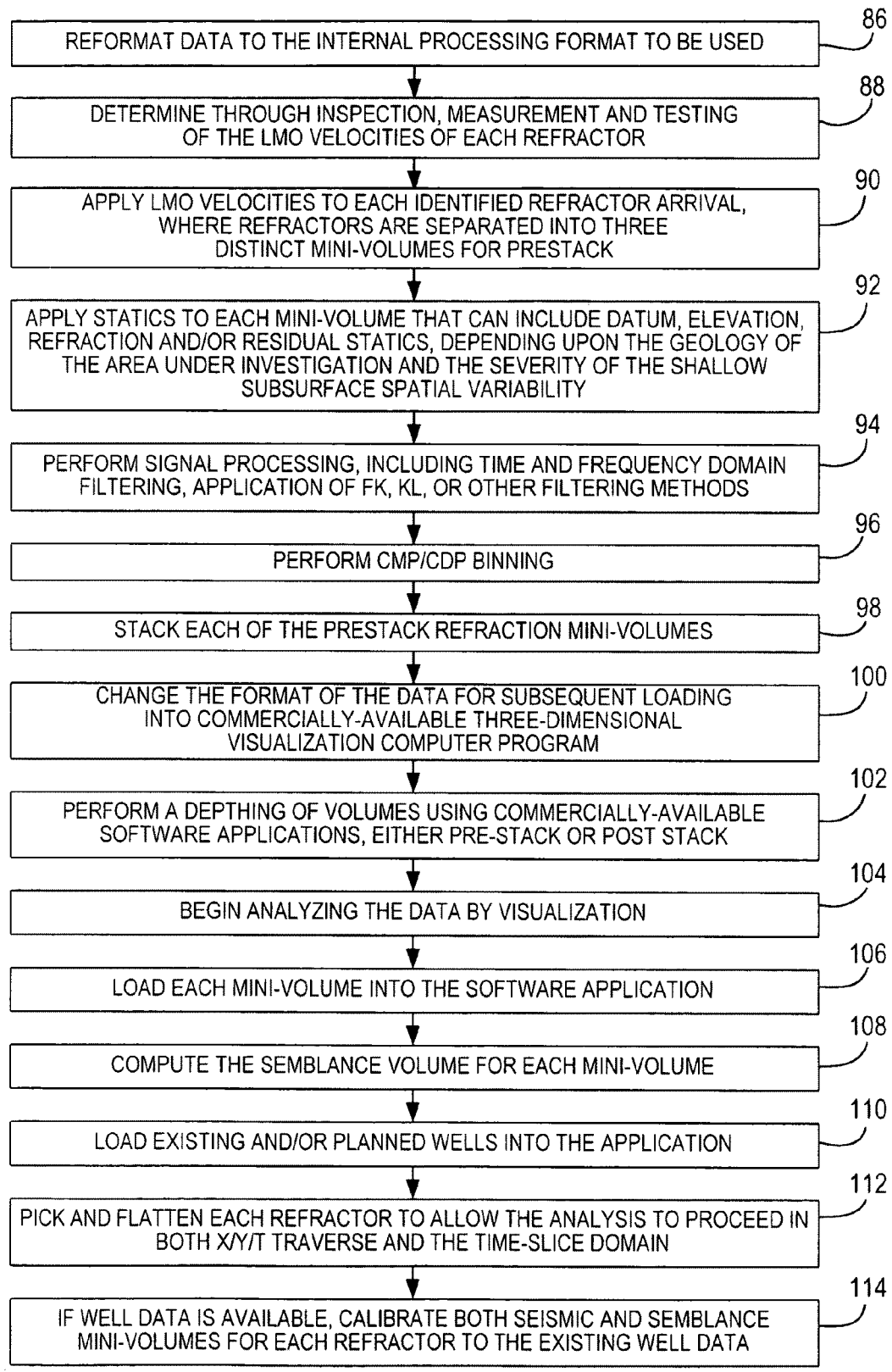
FIG. 15 illustrates a flowchart of another embodiment of the method of operation of the present invention.

In another embodiment, the practice of the process of the invention comprehends the following steps, shown in FIG. 15:

a. data reformatting to the internal processing format to be used;

b. determination through inspection, measurement and testing of the LMO velocities of each refractor. An alternate technique of static correction which corresponds to an LMO value/function can be applied. This is sometimes useful for spatial interpolation, should the refractor velocities change spatially;

c. application of LMO velocities to each identified refractor arrival, where refractors are separated into three distinct mini-volumes for prestack;

d. statics application to each mini-volume that can include datum, elevation, refraction and/or residual statics, depending upon the geology of the area under investigation and the severity of the shallow subsurface spatial variability.

e. signal processing, including time and frequency domain filtering, application of FK, KL, or other filtering methods, the selection of which depends upon the area of investigation;

f. CMP/CDP binning;

g. stacking of each of the prestack refraction mini-volumes;

h. format change for subsequent loading into commercially-available three-dimensional visualization computer program; and i. optionally, depthing of volumes using commercially-available software applications, either prestack or post-stack.

The visualization analysis which forms part of the invention includes the steps of:

j. loading each mini-volume into the software application;

k. computing the semblance volume for each mini-volume;

l. loading of existing and/or planned wells into the application;

m. picking and flattening of each refractor to allow the analysis to proceed in both X/Y/T traverses as well as, in the time-slice domain; and n. if well data is available, calibrating both seismic and semblance mini-volumes for each refractor to the existing well data.

Referring to FIG. 15, the process of the present invention includes the steps of reformatting the data 12, 14 in step 86 using the data formatting means 22 to the internal processing format to be used; and processing the formatted data in steps 88-114 using the signal processing means 24, including the steps of determining through inspection, measurement and testing of the LMO velocities of each refractor in step 88; applying LMO velocities to each identified refractor arrival, where refractors are separated into three distinct mini-volumes for prestack in step 90; and applying statics in step 92 to each mini-volume that can include datum, elevation, refraction and/or residual statics, depending upon the geology of the area under investigation and the severity of the shallow subsurface spatial variability.

The process further includes the steps of: performing signal processing, including time and frequency domain filtering, application of FK, KL, or other filtering methods in step 94; performing CMP and common depth point (CDP) binning in step 96; stacking each of the prestack refraction mini-volumes in step 98; and changing the format of the data in step 100 for subsequent loading into commercially-available three-dimensional visualization computer program 26 as described herein.

The process also includes the steps of: performing a depthing of volumes in step 102 using commercially-available software applications, either prestack or post-stack; beginning analysis of the data by visualization in step 104; loading each mini-volume into the software application in step 106; computing the semblance volume for each mini-volume in step 108; loading existing and/or planned wells in the well siting data 14 into the software application in step 110; picking and flattening each refractor in step 112 to allow the analysis to proceed in both X/Y/T traverses as well as in the time-slice domain; and if well data 14 is available, calibrating both seismic and semblance mini-volumes for each refractor to the existing well data in step 114.

Figure 16:
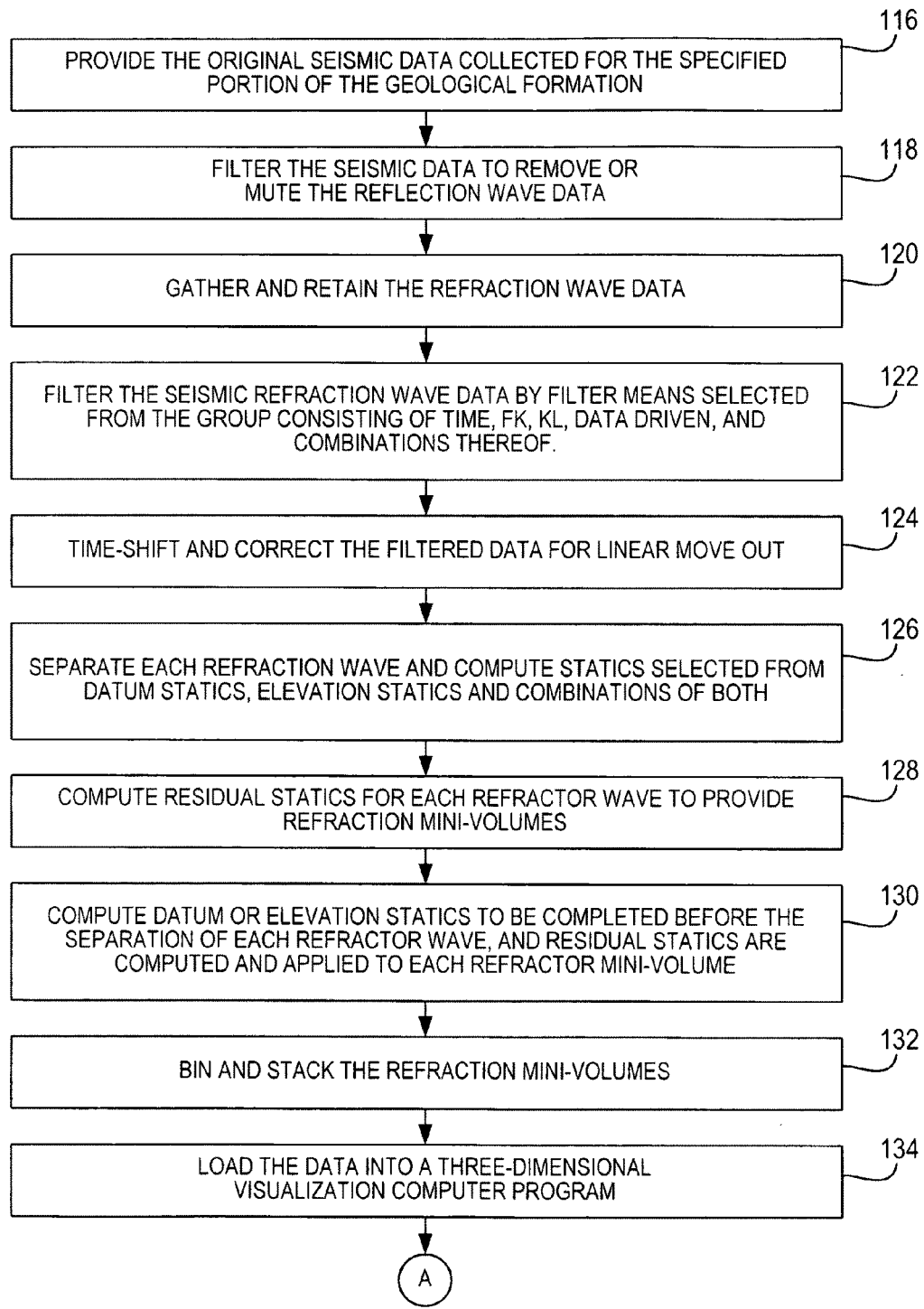
FIGS. 16-17 illustrate flowcharts of a further embodiment of the method of operation of the present invention.
Figure 17:
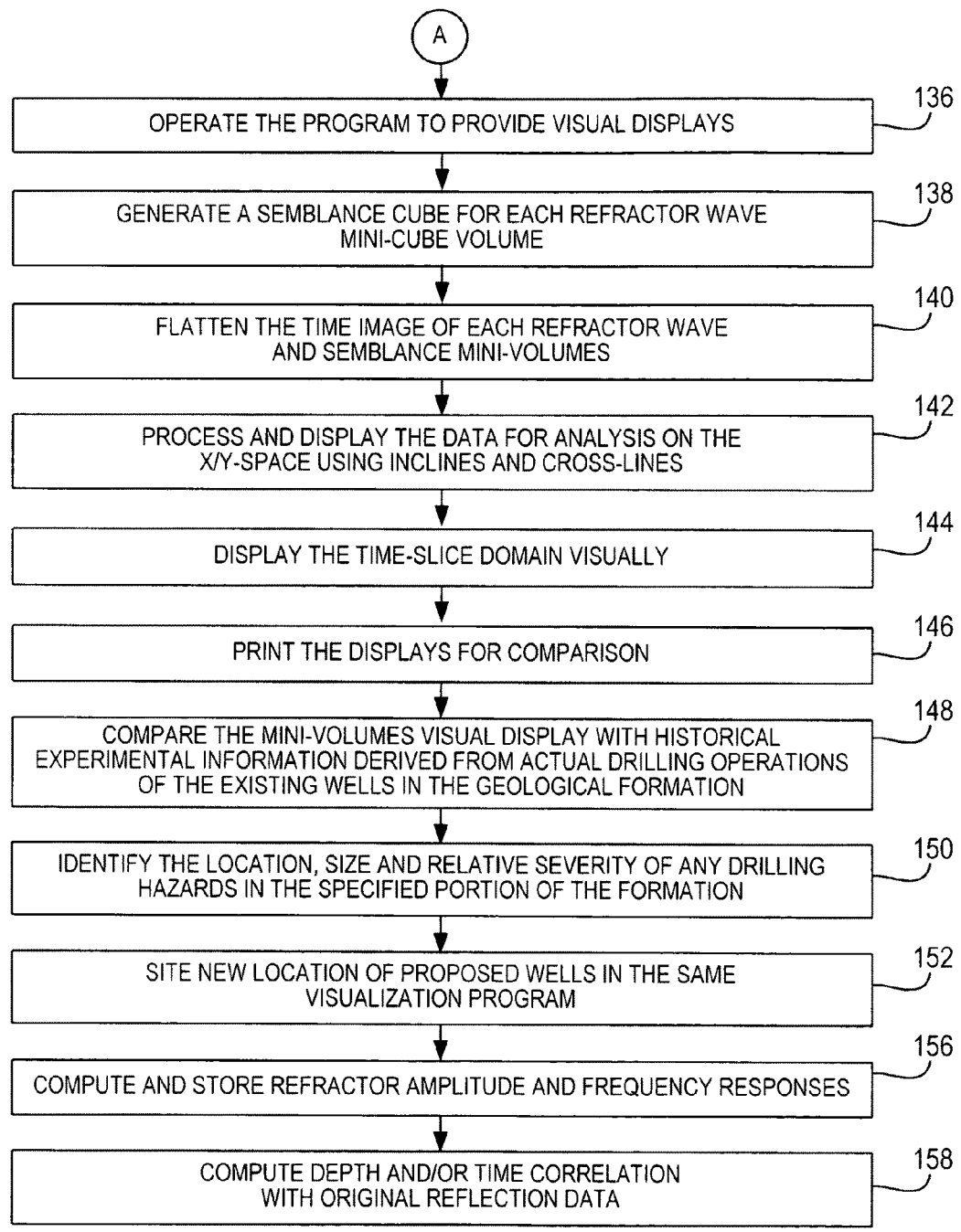

In an alternative embodiment of the method of the present invention, the method can include steps 116-158 illustrated in FIGS. 16-17, having the steps of: providing the original seismic data 12 collected for the specified portion of the geological formation in step 116; filtering the seismic data 12 in step 118 to remove or mute the reflection wave data; gathering and retaining the refraction wave data in step 120; and filtering the seismic refraction wave data in step 122 by filter means included in the signal processing means 24. The filter means is selected from the group consisting of time, frequency-wave number filtering (FK), Karhunen-Loewe (KL) data processing, data driven, and combinations thereof.

The method of FIGS. 16-17 further includes the steps of: time-shifting and correcting the filtered data for LMO in step 124; separating each refraction wave and computing statics selected from datum statics, elevation status and combinations of both, in step 126; computing residual statics for each refractor wave in step 128 to provide refraction mini-volumes; computing datum or elevation statics in step 130 to be completed before the separation of each refractor wave, with residual statics being computed and applied to each refractor mini-volume; binning and stacking the refraction mini-volumes in step 132; and loading the data into a three-dimensional visualization computer program 26 in step 134.

As shown in FIG. 17, the method also includes the steps of operating the program 26 in step 136 to provide visual displays on the display 32; generating a semblance cube for each refractor wave mini-cube volume in step 138; flattening the time image of each refractor wave and semblance mini-volumes in step 140; processing and displaying the data on the display 32 in step 142 for analysis on the X/Y-space using inlines and cross-lines; displaying the time-slice domain visually in step 144; optionally printing the displays for comparison using the printer 34 in step 146; comparing the mini-volumes visual display in step 150 with historical experiential information derived from actual drilling operations of the existing wells in the geological formation; identifying the location, size and relative severity of any drilling hazards in the specified portion of the formation in step 152; siting new wells in step 154 for drilling in areas that are displaced from any identified drilling hazards; plotting the location of proposed wells in step 154 in the same visualization program 26; computing and storing refractor amplitude and frequency responses in the memory 20 in step 156; and computing depth and/or time correlations with original reflection data in step 158.

The various steps of the method shown in FIGS. 16-17 can be performed by the processor 18 employing various hardware and/or software implementing the data formatting means 22; the signal processing means 24; the three-dimensional visualization software program 26; and/or other means incorporated in the processor 18, including means for receiving the original seismic data collected for the specified portion of the geological formation; first filter means for filtering the seismic data to remove or mute the reflection wave data; means for gathering and retaining the refraction wave data; and second filter means for filtering the seismic refraction wave data by filter means selected from the group consisting of time FK, KL, data driven, and combinations thereof.

The various means can also include means for time-shifting and correcting the filtered data for linear move out (LMO); means for separating each refraction wave and computing statics selected from datum statics, elevation status and combinations of both; means for computing residual statics for each refractor wave to provide refraction mini-volumes; means for binning and stacking the refraction mini-volumes obtained by the computing means; means for loading the binned and stacked data into a three-dimensional visualization computer program and operating the program to provide visual displays; and means for generating a semblance cube for each refractor wave mini-cube volume.

The various means can further include means for flattening the time image of each refractor wave and semblance mini-volumes; means for outputting to the output device time-slice domain data to be visualized; means for comparing the mini-volumes visual display from the flattening means with historical experiential information derived from actual drilling operations of the existing wells in the geological formation; means for identifying the location, size and relative severity of any drilling hazards in the specified portion of the formation; processing means for processing and displaying the data for analysis on the X/Y-space using inlines and cross-lines; means for completing the computation of datum or elevation statics before the separation of each refractor wave, wherein the processor computes and applies residual statics to each refractor mini-volume; and means for receiving siting data for siting new wells for drilling in areas that are displaced from any drilling hazards identified by the identifying means.

Figure 18:
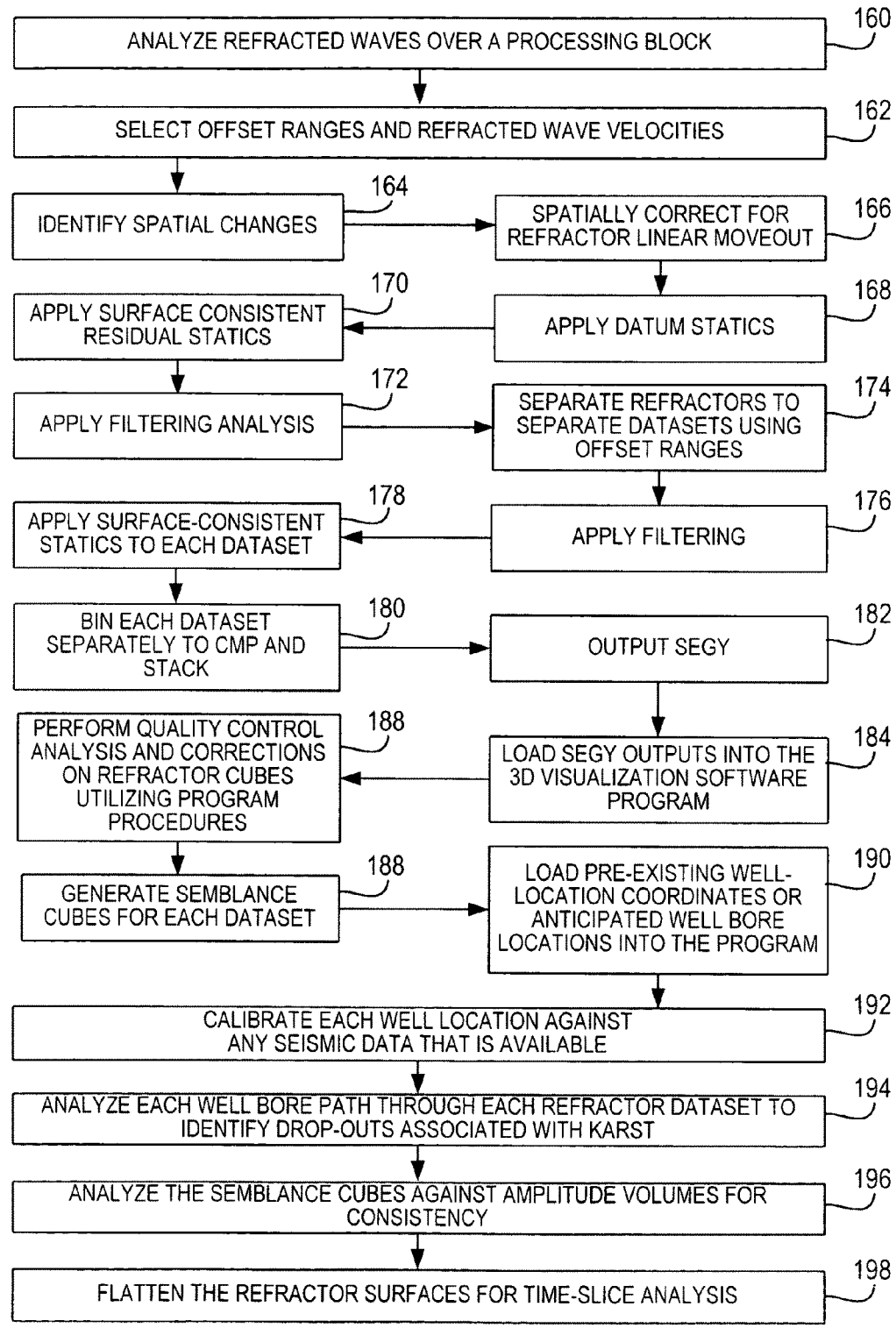
FIG. 18 illustrates a flowchart of an additional embodiment of the method of operation of the present invention.

In another alternative embodiment, the method of the invention includes steps 160-198 illustrated in FIG. 18 for processing the seismic data 12 using the signal processing means 24 including the steps of: analyzing refracted waves over a processing block in step 160; selecting offset ranges and refracted wave velocities in step 162; identifying spatial changes in step 164; spatially correcting for refractor linear moveout in step 166; applying datum statics in step 168; applying surface consistent residual statics in step 170; applying filtering analysis in step 172; separating refractors to separate datasets using offset ranges in step 174; applying filtering in step 176; applying surface-consistent statics to each dataset in step 178; binning each dataset separately to CMP data and a stack in step 180; and outputting the data in step 182 in the Society of Exploration Geophysicists "Y" (SEGY) data format to be saved in the memory 20 or to be output to the three-dimensional visualization software 26.

To perform the visualization and mapping, the method of FIG. 18 further includes the steps of loading SEGY outputs in step 184 into the three-dimension software visualization program 26; performing quality control analysis and corrections on refractor cubes utilizing program procedures in step 186; generating semblance cubes for each dataset in step 188; loading pre-existing well-location coordinates or anticipated well bore locations as the well siting data 14 into the program 26 in step 190; calibrating each well location against any seismic data 12 that is available in step 192; analyzing each well bore path through each refractor dataset in step 194 to identify drop-outs associated with karsts; analyzing the semblance cubes against amplitude volumes for consistency in step 196; and flattening the refractor surfaces for time-slice analyses in step 198.

Representative Field Applications

In operation, the present invention was applied to a set of wells with the following characteristics:

1. A well labeled "950" experienced lost circulation and a stuck drill bit, which had to be twisted off. Corrective actions taken included cementing the drilling zone down the hole of the well for over a week to attempt to recover the well, eventually abandoning the original well, and re-drilling through the cement.

2. A well labeled "912" encountered 100% circulation losses in three depth zones: at 377 ft., 430 ft., and 510 ft.

3. A well labeled "654" encountered 100% circulation losses in two depth zones: at 435 ft., and at 490 ft.

Figure 19:
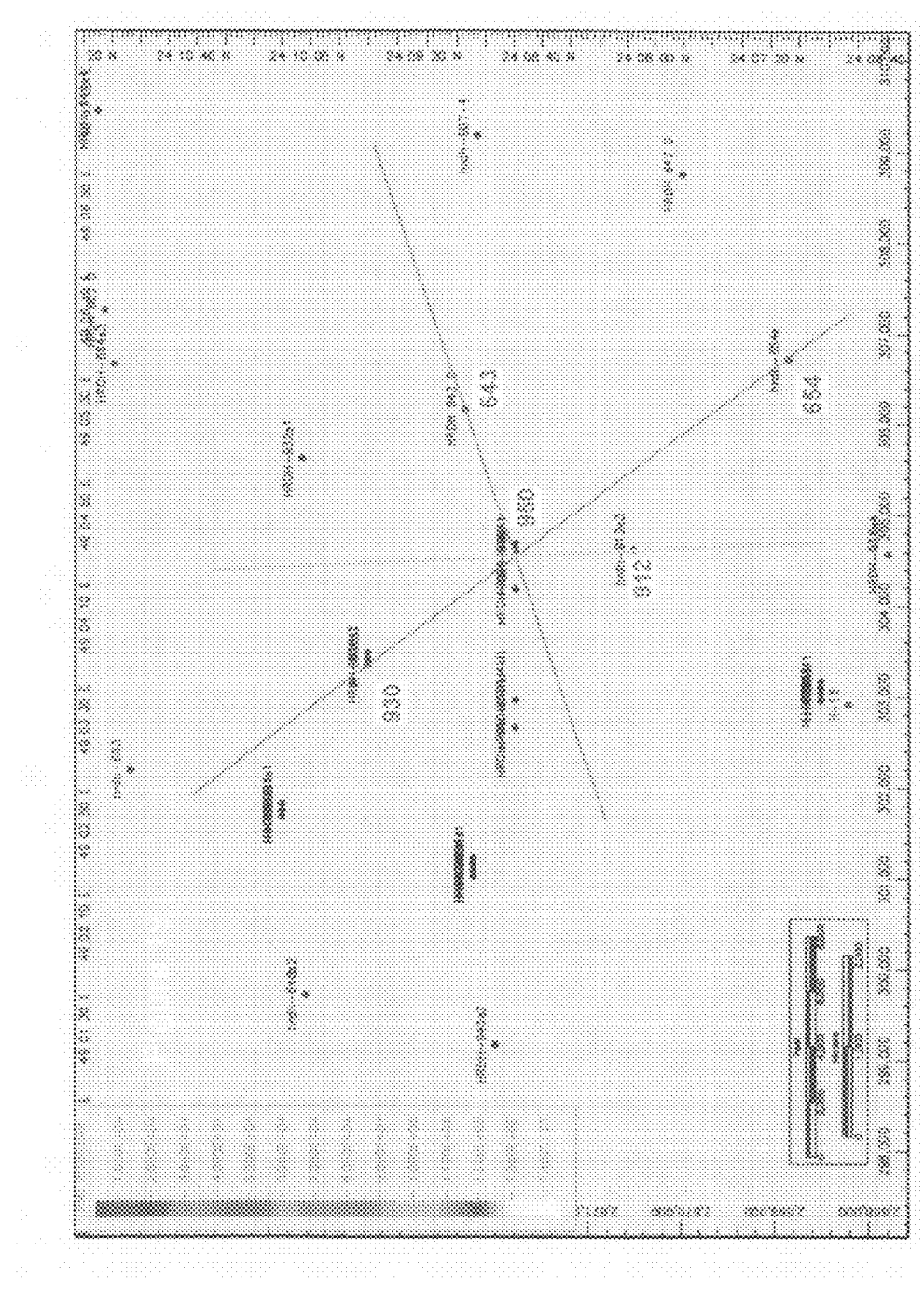
FIG. 19 illustrates a map view of example wells with traverses through various wells.

A map view from above of the example wells is shown in FIG. 19, in which example traverses defining cross-sectional cuttings passing through various wells in the immediate area of at least wells 950, 912, and 654 are illustrated.

Figure 20:
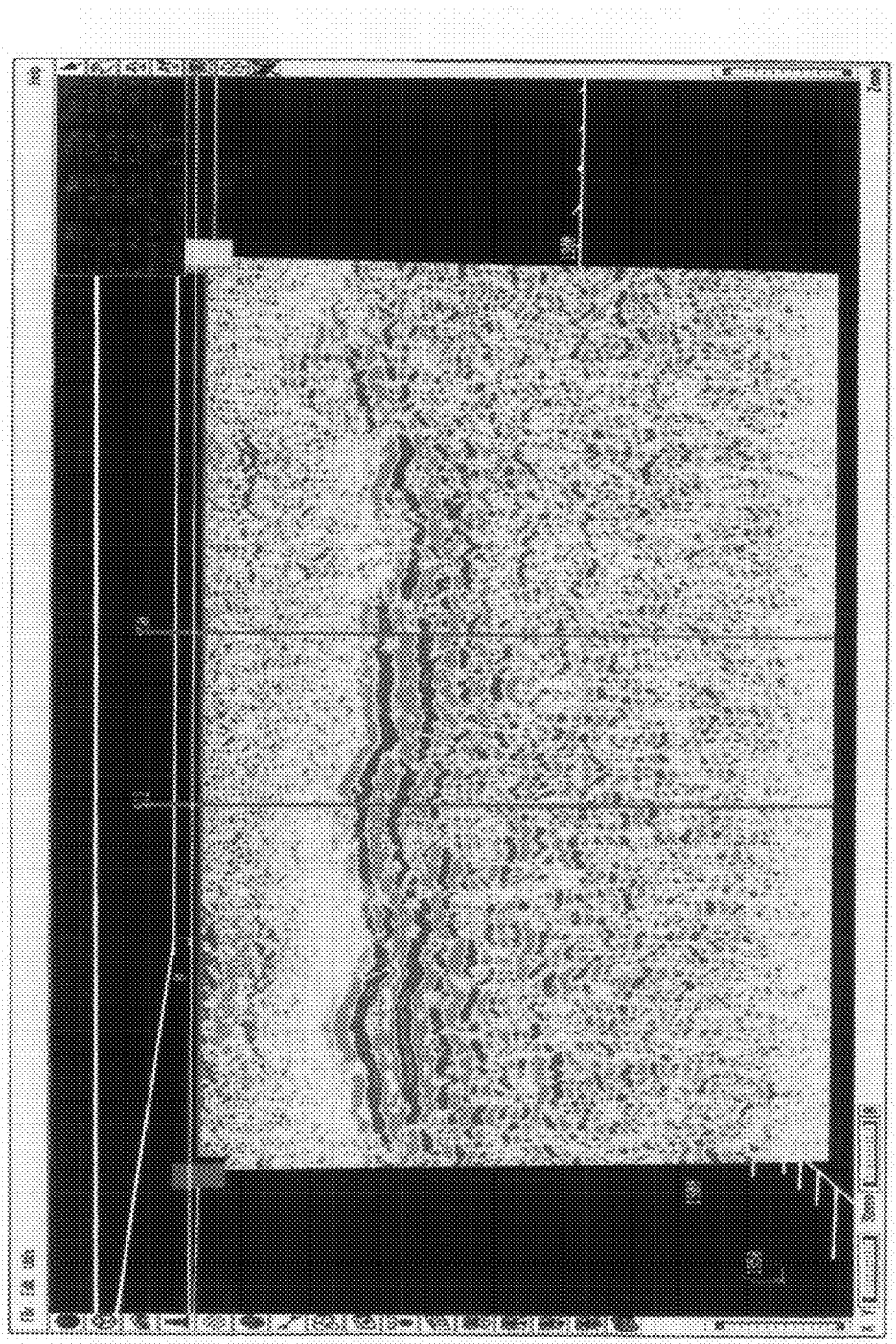
FIG. 20 illustrates a cross-section of a three-dimensional view of an mid-offset stack cube.

Upon using the present invention on seismic data and well siting data in the immediate area of the wells 950, 912, and 654, the present invention generates an image of amplitudes present in a cutting or cross-section of a three-dimensional view in FIG. 20 of an mid-offset stack cube with the cutting including wells 912 and 950, and with well bores being the vertical lines. As shown in FIG. 20, as the wells cut through the zones of the immediate area, slight disturbances in the seismic data are visible as compared to the left-hand side of the image without wells in an area of high continuity. Visual inspection of the view of FIG. 20 generated by the present invention indicates that minor and manageable losses in circulation of the wells in the displayed area can be expected.

Figure 21:
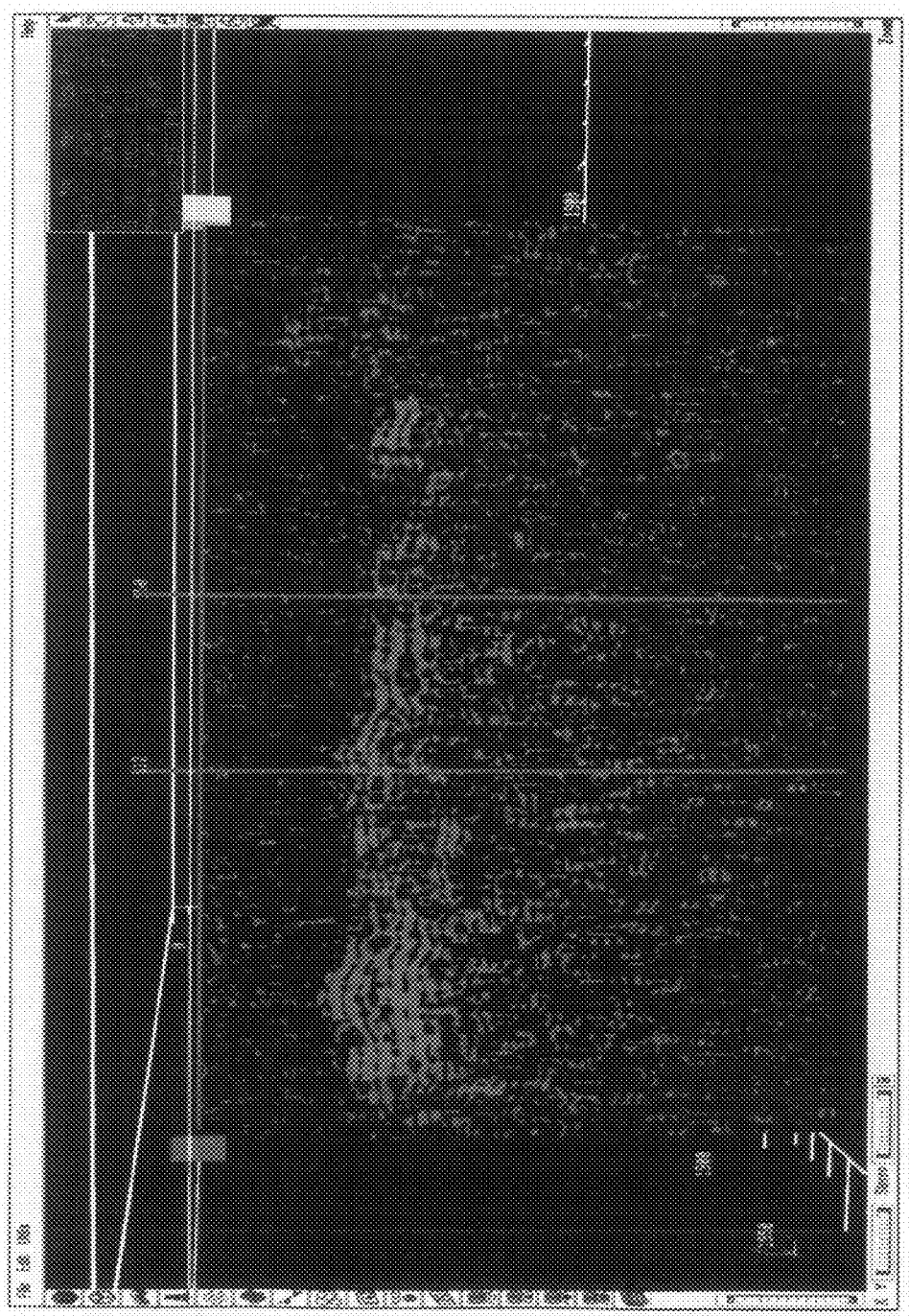
FIG. 21 illustrates a semblance rendering of the mid-offset stack cube of FIG. 20.

FIG. 21 illustrates a semblance rendering of the mid-offset stack cube of FIG. 20, which shows the same basic relationship of disturbances in the seismic data relative to the position of sited wells.

Figure 22:
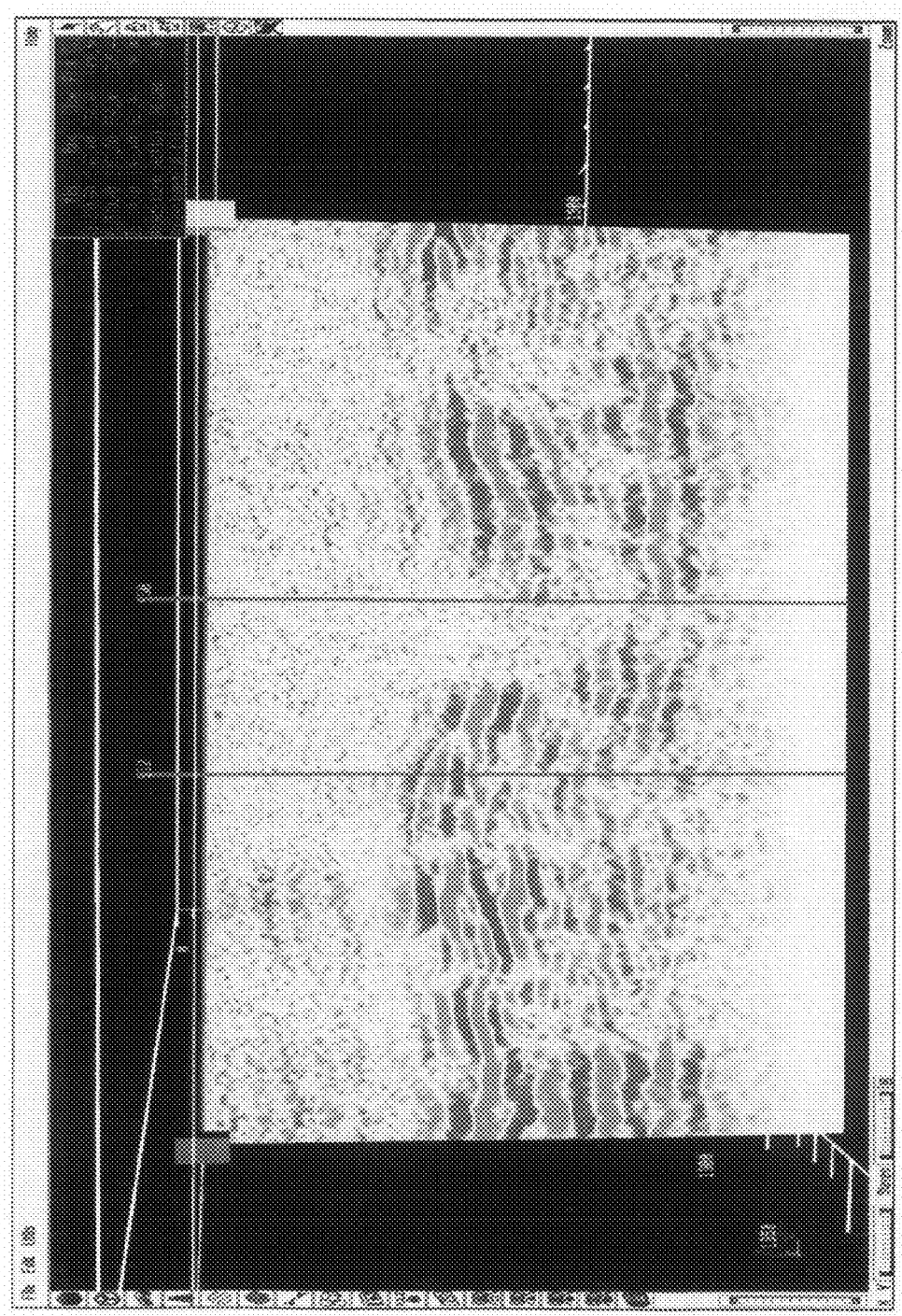
FIG. 22 illustrates a cross-section of a three-dimensional view of a far-offset stack cube.

FIG. 22 illustrates a display generated by the present invention cutting through, as a cross-section, of a three-dimensional view of a far-offset stack cube for wells 912 and 950, with the wells 912 and 950 shown as vertical lines under indices "912" and "950", respectively. As shown in FIG. 22, the amplitudes in the seismic data around well 912 indicate a potential of losses in this well, but that such losses can be manageable. However, there is a complete loss of amplitudes in the seismic data around well 950, indicating a possibly significant existence of a buried karst or void space.

Figure 23:
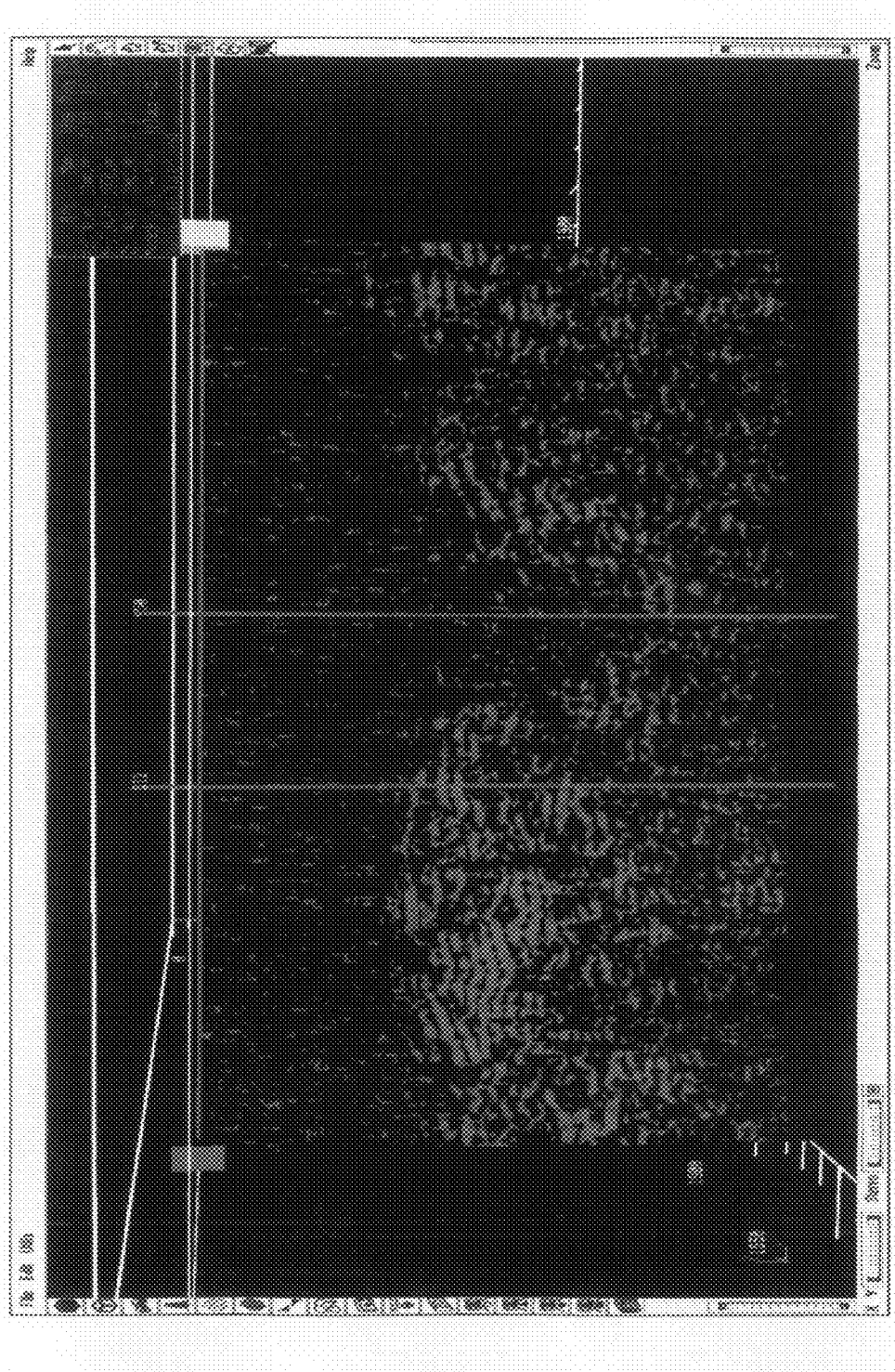
FIG. 23 illustrates a semblance rendering of the far offset stack cube of FIG. 22.

FIG. 23 illustrates a semblance rendering of the far offset stack cube of FIG. 22, which shows the anticipated massive losses in this zone about well 950. As described herein, the performance of the present invention to identify karsts and regions of potential loss of circulation confirmed the actual real-time performance of well 950, which experienced a total circulation loss and a drill bit being stuck, causing loss of over a week of production. Accordingly, the present invention is useful to identify potential problem regions for drilling, and so avoiding problems before they occur.

Figure 24:
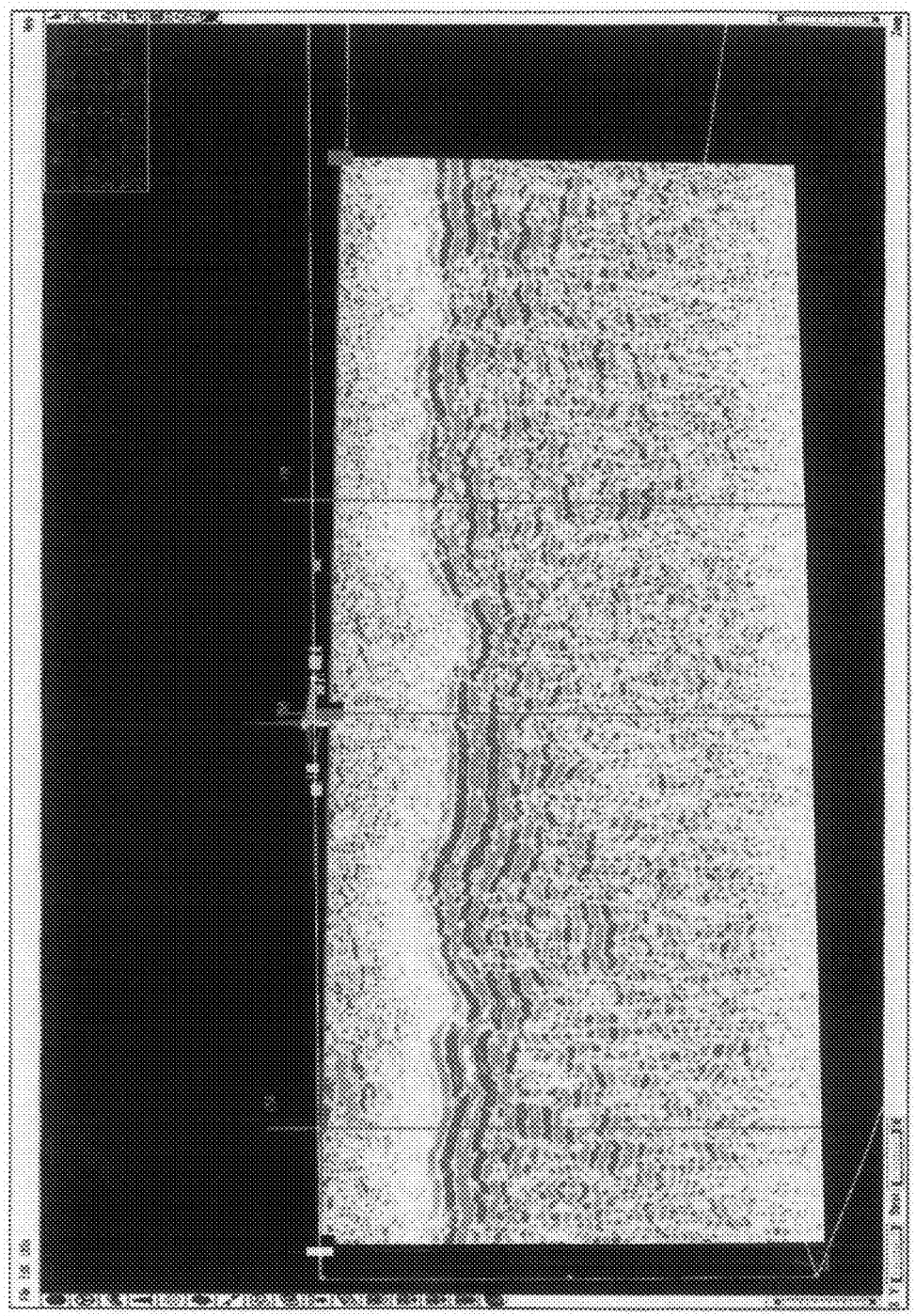
FIG. 24 illustrates a mid-offset stack cube along another traverse shown in FIG. 19 for a first set of wells.

In another example of the performance of the present invention, FIG. 24 illustrates a mid-offset stack cube along another traverse shown in FIG. 19 for wells labeled 930, 950, and 654. The displayed seismic data for well 654 shows the highest, and therefore best, amplitudes indicative of an expected problem-free performance of the drilling in the region about well 654. As described herein, well 654 actually experienced two areas of lost circulation, which were manageable, indicating that the areas of lost circulation were quite small. Such performance of well 654 is consistent with the performance of the present invention shown in FIG. 24 indicating relatively high expectation of few problems with well 654.

On the other hand, FIG. 24 indicates that, compared to well 654, wells 950 and 930 would have some drilling problems due to the presence of low amplitude areas along the vertical lines of wells 950 and 930 in FIG. 24. At least in the circumstances with well 950, some problems were indeed encountered as would be expected from the operation of the present invention to generate FIG. 24 from the seismic data and well siting data.

Figure 25:
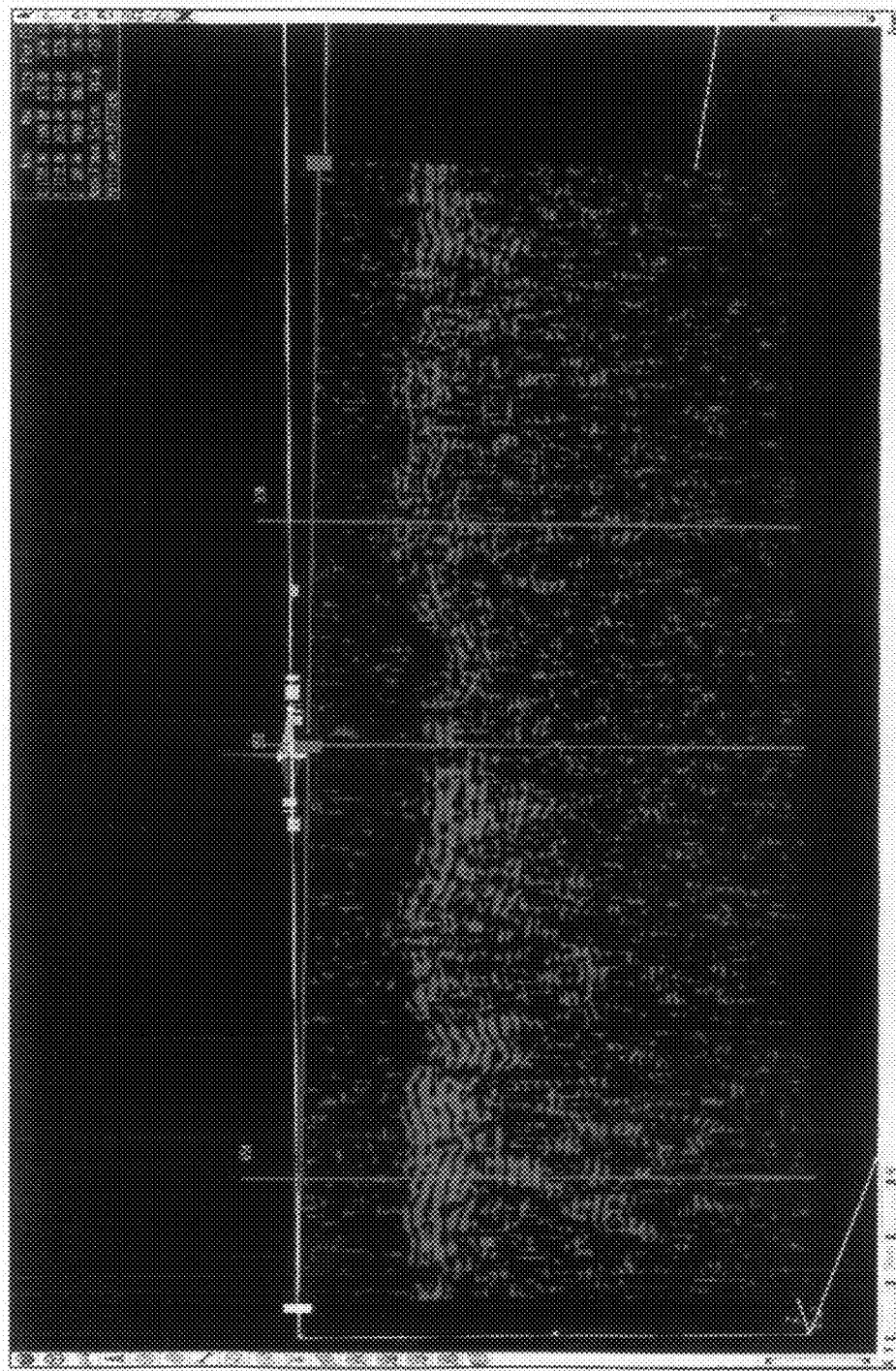
FIG. 25 illustrates a mid-offset semblance cube shown in a cutting cross-section for the first set of wells.

For the traverse of wells 930, 950, and 654, the present invention also generates a mid-offset semblance cube, shown in a cutting cross-section in FIG. 25, which shows the same relationships indicated in FIG. 24. In FIG. 25, an edge present in the relatively good continuity is seen intersecting the vertical line representing well 654, due to the relatively large bin sizes of the data, relative to the size of the borehole of well 654, and the lateral resolution of the seismic data is very approximate. From operation of the present invention, it has been determined that the presence of an edge visible in the view of the mid-offset semblance cube should be indicative of a warning to drilling engineers of potential problems in drilling.

Figure 26:
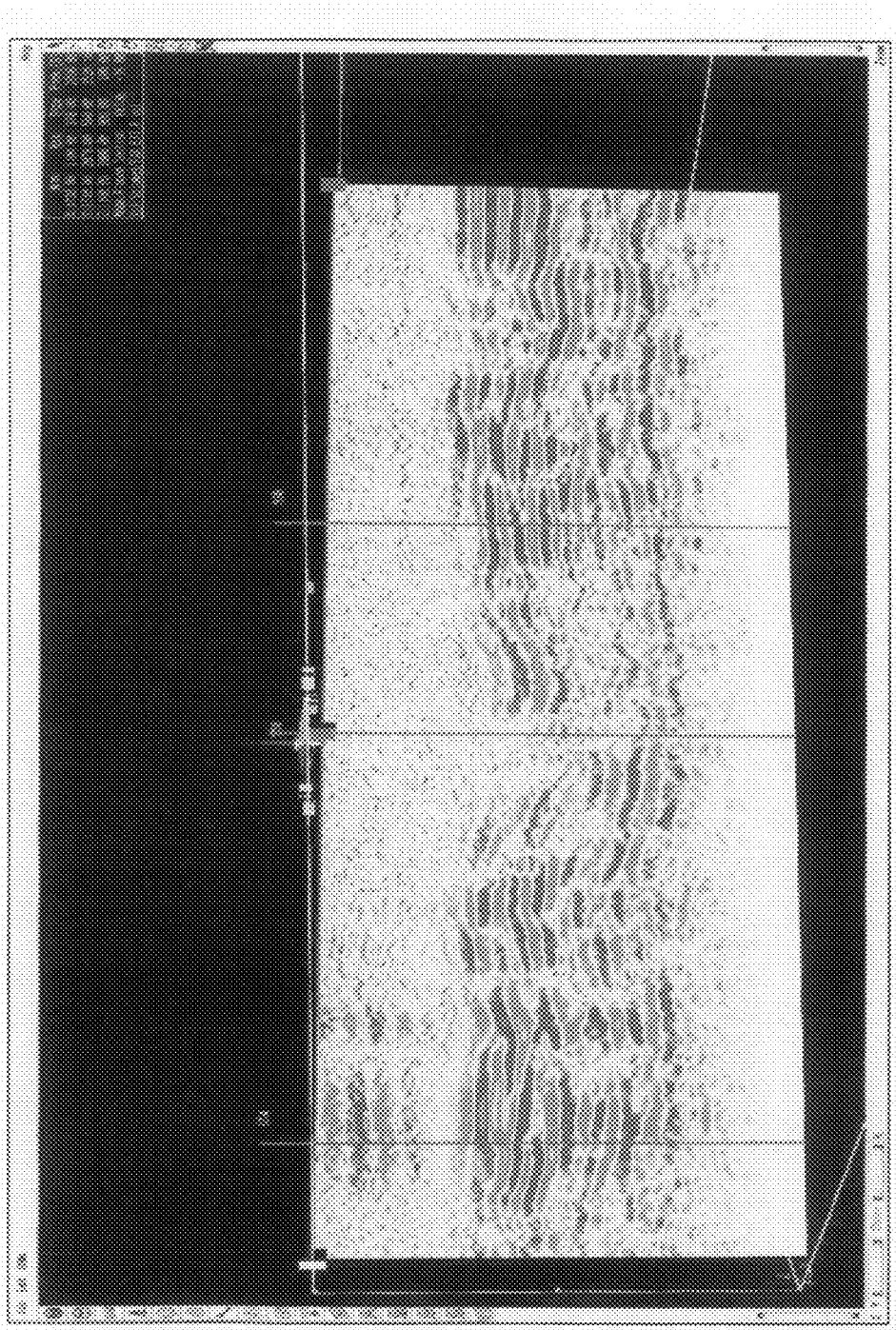
FIG. 26 illustrates a far offset stack cube display in a cutting cross-section for the first set of wells.

FIG. 26 illustrates a far offset stack cube display, in a cutting cross-section for wells 930, 950, and 654. The seismic data for well 950 shows massive disturbances indicating the presence of a karst, which is consistent with the previous indications by the present invention shown in FIGS. 22-23 and consistent with the actual performance and problems encountered with well 950.

Figure 27:
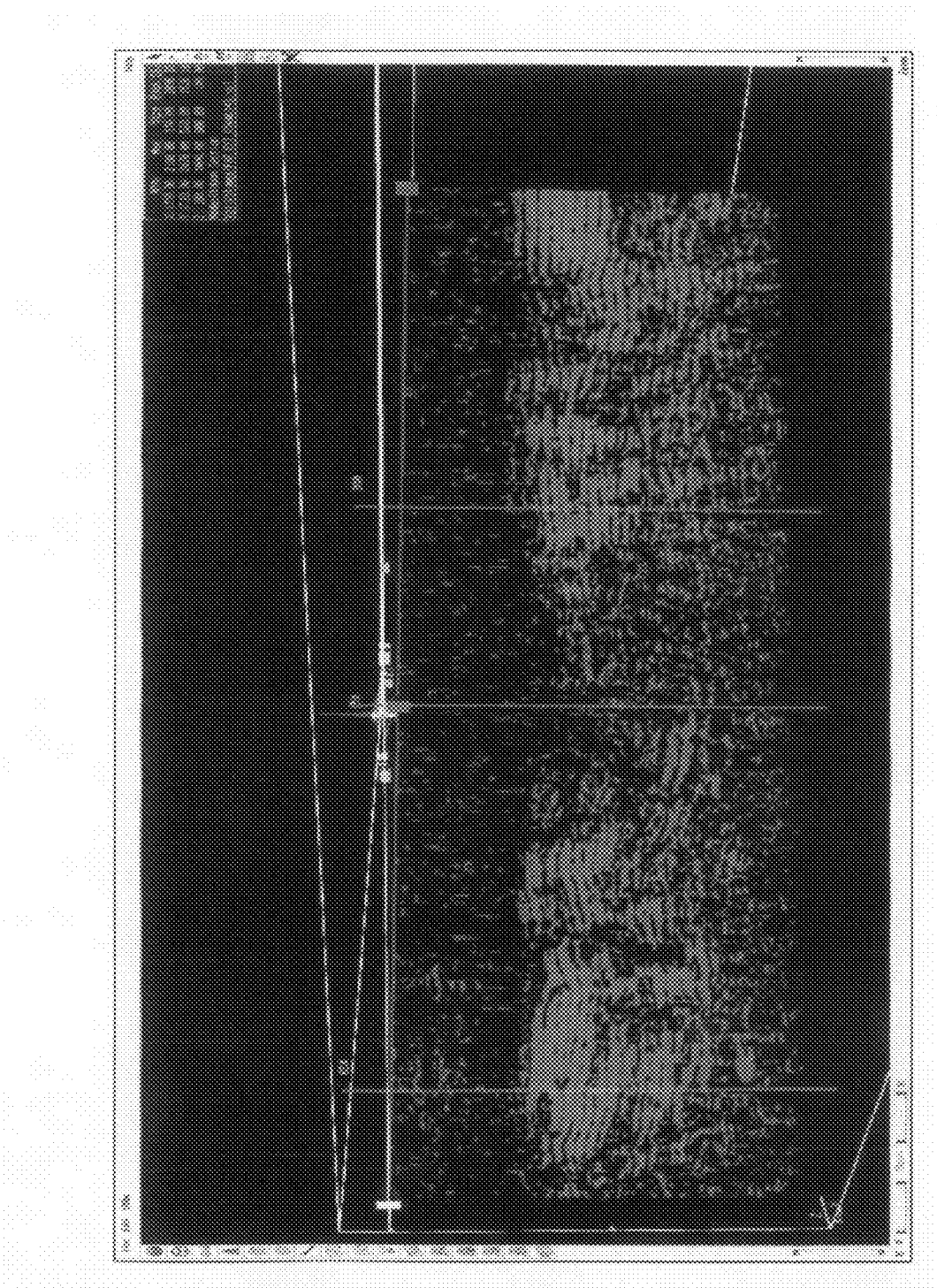
FIG. 27 illustrates a far offset semblance cube shown in a cutting cross-section for the first set of wells.

Similarly, FIG. 27 illustrates a far offset semblance cube display, in a cutting cross-section for wells 930, 950, and 654, which presents more visible details to the user. In the case of well 950, such greater visibility of details provided by the present invention by a semblance cube display is not required, since previous views clearly indicated that a large void would be encountered for well 950.

Figure 28:
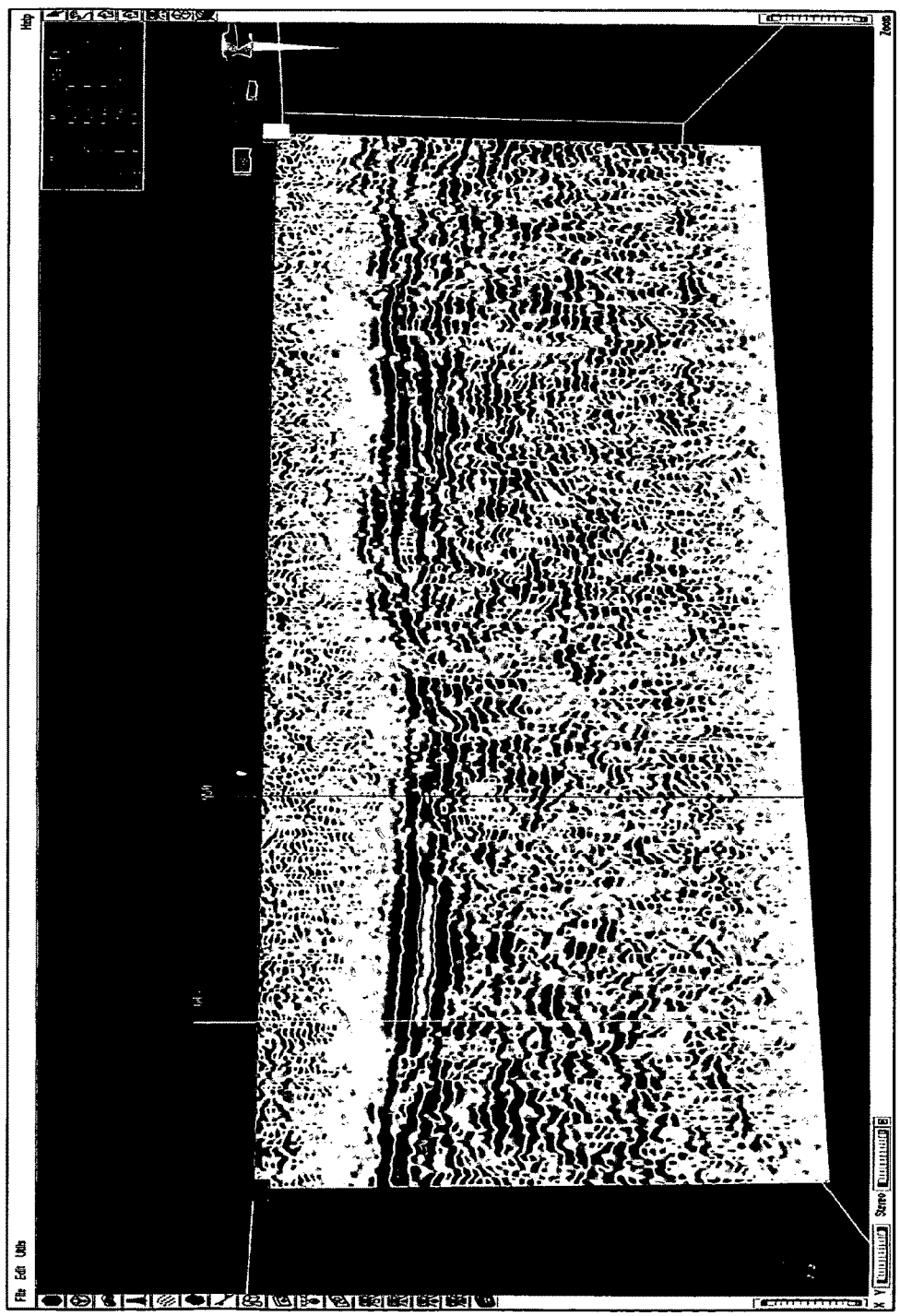
FIG. 28 illustrates a mid-offset stack cube with a cutting cross-section for a second set of wells.

FIG. 28 illustrates a mid-offset stack cube, with a cutting cross-section for wells 643 and 950, with well 643 being the site of a future well. As described previously, although the seismic data shown in FIG. 28 has high amplitudes in the shallow zone which would indicate that well 950 would traverse the shallow zone without undue difficulty, the deeper zones present seismic data with low amplitudes, indicative of possible voids which would cause more difficulties, as was actually encountered for well 950.

However, due to the relatively high amplitudes in the seismic data for the proposed site of well 643, using the present invention with the display shown in FIG. 28, an operator would anticipate little or no trouble drilling in the zone for well 643. Similarly, the mid-offset semblance view of FIG. 29, corresponding to the related display in FIG. 28, provides a consistent visualization of the seismic data of wells 950 and 643.

Figure 29:
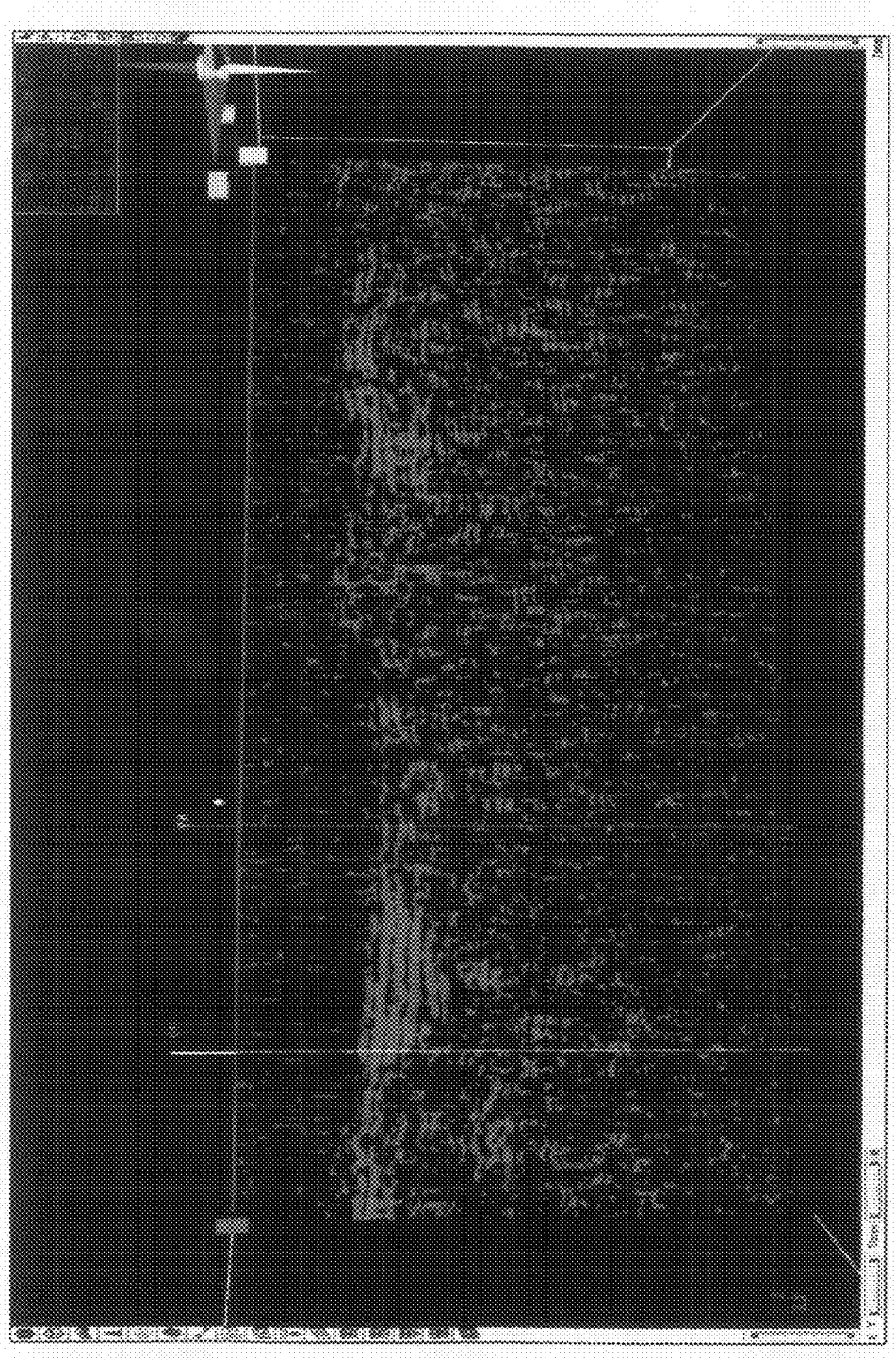
FIG. 29 illustrates a mid-offset semblance view for the second set of wells.
Figure 30:
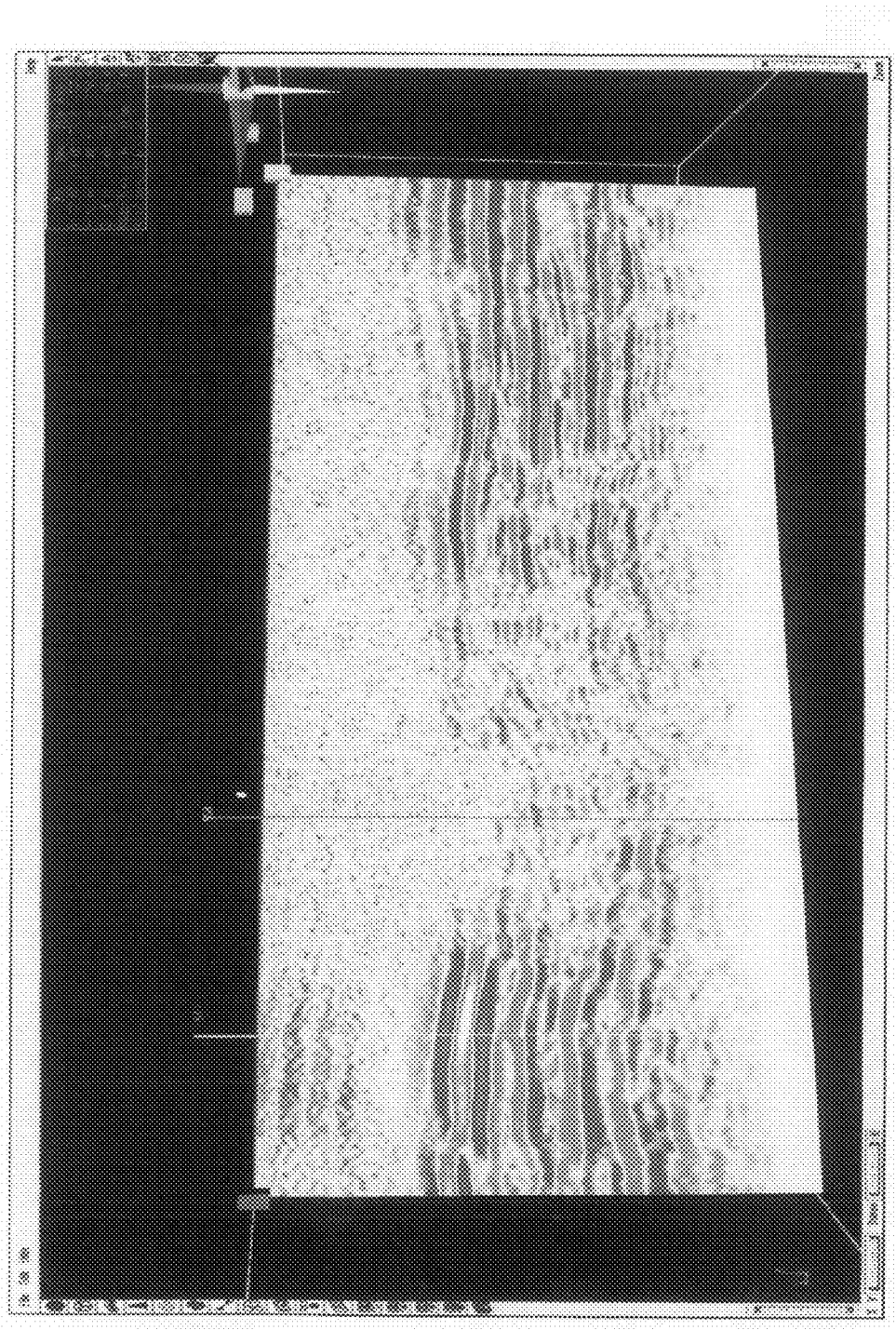
FIG. 30 illustrates a far offset stack cube display in a cutting cross-section for the second set of wells.

Similarly, a far offset stack cube is displayed in FIG. 30, in a cutting cross-section for wells 643, 950, corresponding to FIGS. 28-29. Consistent with the indications of FIGS. 28-29, an operator viewing the display of the present invention using the display in FIG. 30 would project few losses for proposed well 643, due to the relatively high amplitudes in the seismic data, as compared to the indications of significant losses for well 950 due to the relatively low amplitudes indicating voids for well 950 in FIG. 30.

Figure 31:
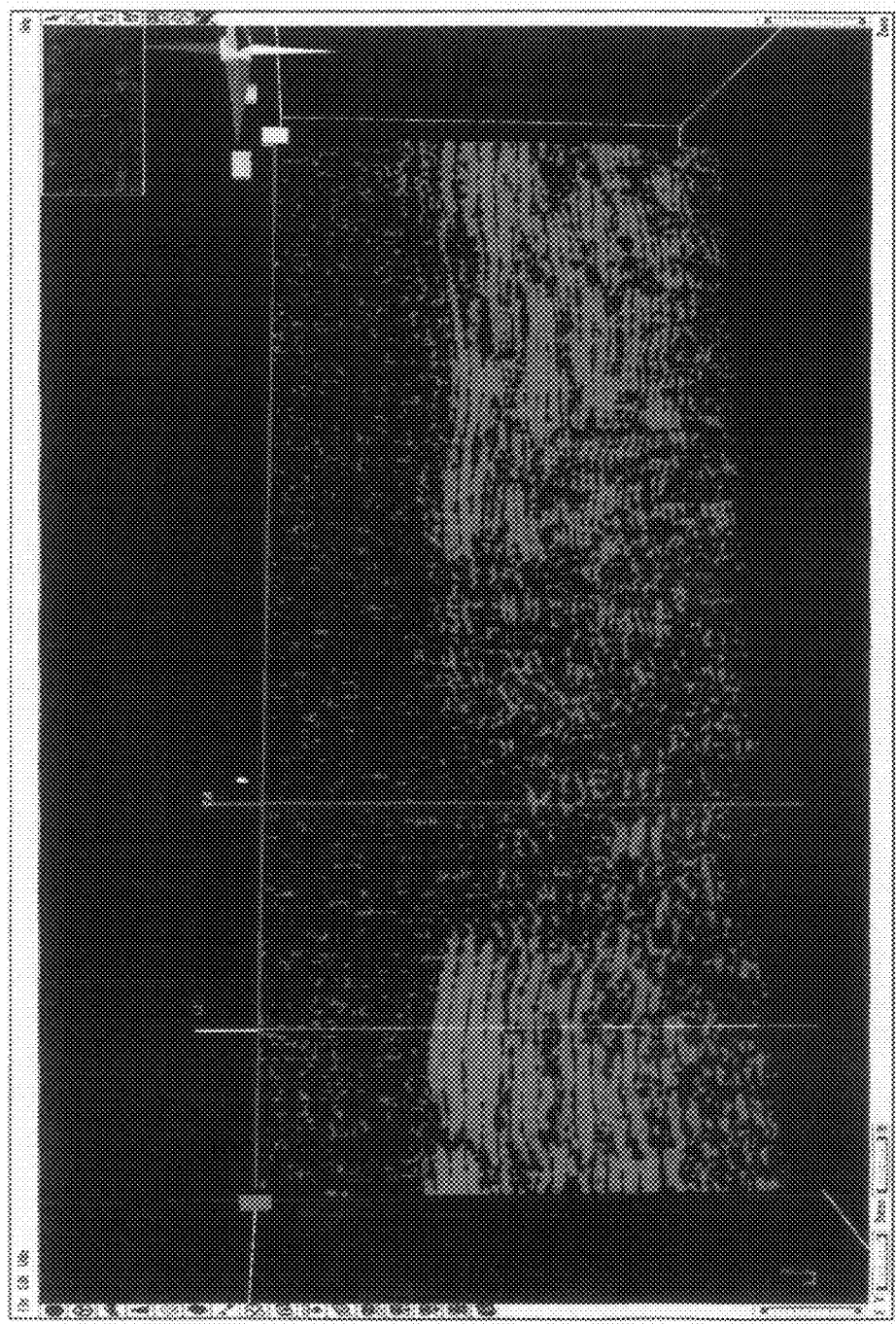
FIG. 31 illustrates a far offset semblance cube shown in a cutting cross-section for the second set of wells.

In addition, a far offset semblance cube display is shown in FIG. 31 for wells 643 and 950, showing a cutting cross-section corresponding to FIGS. 28-30. Unlike the previous views for proposed well 643, the displayed seismic data indicates small possible voids to be expected for well 643 which are not obvious from the previous amplitude display. Such indications from the display in FIG. 31 generated by the present invention would suggest a warning to the drilling engineers to expect minor losses associated with well 643.

The system 10 and methods of the present invention, as described herein, provides a process which predicts shallow drilling hazards such as karsting and unconsolidated collapses in carbonate rock strata. These hazards are very costly and dangerous to exploration and development drilling programs. This process requires no specialized high-resolution seismic surveys, but instead uses existing three-dimensional seismic data normally designed for wildcat or reservoir development. It is also a very fast procedure which means that, in addition to the normal seismic product, a second set of data can be quickly given to interpreters and drilling engineers in order to alert them to the presence of shallow drilling hazards. In addition, the present invention can increase the accuracy of the prediction of drilling hazards, for example, by increasing the bin sizes of the production seismic data.

The invention is highly useful in optimizing well planning, placement, and execution to avoid such hazards where possible, and when it is not possible, to allow the drilling engineers to modify the drilling plan in contemplation of such hazards in order to minimize risks of loss of equipment and of injury to personnel, as well as saving associated costs and resources due to the reduction and avoidance of such hazards.

This process is cost-effective to implement since no specialized software or hardware is required. Normal three-dimensional visualization software that is commercially available from a variety of vendors can be used for the interpretation of data when processed in accordance with the invention.

The benefits of cost savings, enhanced safety for drilling personnel and reduced mechanical drilling risk are achieved with a minimal capital outlay and in a relatively short time.

While the preferred embodiments of the present invention have been shown and described, it will be obvious that such embodiments are provided by way of example only. Numerous variations, changes and substitutions will occur to those of ordinary skill in the art without departing from the invention. Accordingly, it is intended that the spirit and scope of the invention be limited only by the appended claims.

I claim:

1. A method for identifying shallow subsurface drilling hazards located below the earth's surface and including karsts, voids, unconsolidated discontinuities and partial collapses, said system utilizing petroleum exploration seismic survey data prepared for a specified portion of a geological formation containing existing wells, the method comprising the steps of:
   a. providing the original seismic data that includes reflection and refraction wave data collected for the specified portion of the geological formation;
   b. filtering the seismic data to remove or mute the reflection wave data;
   c. gathering and retaining the refraction wave data;
   d. filtering the seismic refraction wave data by filter means selected from the group consisting of time FK, KL, data driven, and combinations thereof;
   e. time-shifting and correcting the filtered data for linear move out (LMO);
   f. separating each refraction wave and computing statics selected from datum statics, elevation statics and combinations of both;
   g. computing residual statics for each refractor wave to provide refraction mini-volumes;
   h. binning and stacking the refraction mini-volumes obtained in step (g);
   i. loading the data from step (h) into a three-dimensional visualization computer program and operating the program to provide visual displays selected from 3-D X/Y/T space, inline and cross-line space and timeslice space;
   j. generating a semblance cube for each refraction wave mini-cube volume;
   k. flattening the time image of each of the refraction wave mini-volumes and semblance cubes and displaying the flattened images;
   l. displaying the time-slice domain visually;
   m. comparing the refraction wave mini-volumes and semblance cubes visual display from step (k) with historical experiential information derived from actual drilling operations of the existing wells in the geological formation; and
   n. based on the comparison of data and information in step (m), identifying the location, size and relative severity of any drilling hazards in the specified portion of the formation.

2. The method of claim 1 which includes the further step following step (k) of processing and displaying the data for analysis using inlines and cross-lines.

3. The method of claim 1, wherein the computation of datum or elevation statics is completed before the separation of each refractor wave, and residual statics are computed and applied to each refractor mini-volume.

4. The method of claim 1, wherein the seismic refraction data is filtered in step (d) by a method selected on the basis of the refracted wave data.

5. The method of claim 1, wherein the visual displays are printed for comparison.

6. The method of claim 1 which further includes:
   o. siting new wells for drilling in areas that are displaced from any drilling hazards identified in step (n).

7. The method of claim 1 which further includes the steps of:
- plotting the location of proposed wells in the same visualization program employed in step (i);
  - computing and storing refractor amplitude and frequency responses; and
  - computing depth and/or time correlations with the original reflection data from step (a).

8. The method of claim 1 in which the analysis is performed for drilling hazards located at about less than four thousand feet below the earth's surface.

9. The method of claim 8, wherein the depth is determined by the design of the original seismic acquisition survey and the maximum recorded offset ranges.

10. A method of processing and displaying hydrocarbon exploration seismic data prepared for a specified portion of a geological formation in order to identify the location of shallow subsurface drilling hazards, the method comprising the steps of:
- a. analyzing refracted waves over a processing block;
- b. selecting offset ranges and refracted wave velocities;
- c. identifying spatial changes;
- d. spatially correcting for refractor linear move out;
- e. applying datum statics;
- f. applying surface-consistent residual statics;
- g. applying filtering analysis;
- h. separating refractors to separate datasets using offset ranges;
- i. applying filtering;
- j. applying surface-consistent statics to each dataset;
- k. binning each dataset separately to CMP and stack;
- l. outputting SEGY;
- m. loading SEGY outputs into a three-dimensional software visualization program;
- n. performing quality control analysis and corrections on refractor cubes utilizing program procedures;
- o. generating semblance cubes for each dataset;
- p. loading pre-existing well location coordinates or anticipated well bore locations into the program of step (m);
- q. calibrating each well location against any seismic data that is available;
- r. analyzing each well bore path through each refractor dataset to identify only drop-outs associated with karsts;
- s. analyzing the semblance cubes against amplitude volumes for consistency; and
- t. optionally flattening the refractor surfaces for time-slice analyses.

11. A computer-based system for identifying shallow subsurface drilling hazards located below the earth's surface and including karsts, voids, unconsolidated discontinuities and partial collapses, said system utilizing petroleum exploration seismic survey data prepared for a specified portion of a geological formation containing existing wells, the system comprising:
- an output device;
- and a processor including:
  - a. means for receiving the original seismic data collected for the specified portion of the geological formation;
  - b. first filter means for filtering the seismic data to remove or mute the reflection wave data;
  - c. means for gathering and retaining the refraction wave data;
  - d. second filter means for filtering the seismic refraction wave data by filter means selected from the group consisting of time FK, KL, data driven, and combinations thereof;
  - e. means for time-shifting and correcting the filtered data for linear move out (LMO);
  - f. means for separating each refraction wave and computing statics selected from datum statics, elevation status and combinations of both;
  - g. means for computing residual statics for each refractor wave to provide refraction mini-volumes;
  - h. means for binning and stacking the refraction mini-volumes obtained by the computing means;
  - i. means for loading the binned and stacked data into a three-dimensional visualization computer program and operating the program to provide visual displays at the output device;
  - j. means for generating a semblance cube for each refractor wave mini-cube volume;
  - k. means for flattening the time image of each refractor wave mini-volume and semblance cube;
  - l. means for outputting to the output device time-slice domain data to be visualized;
  - m. means for comparing the mini-volume visual displays from the flattening means with historical experiential information derived from actual drilling operations of the existing wells in the geological formation; and
  - n. means for identifying the location, size and relative severity of any drilling hazards in the specified portion of the formation.

12. The system of claim 11, further comprising:
- means for processing and displaying the data for analysis on an X/Y-space graph using inlines and cross-lines.

13. The system of claim 11, wherein the processor completes the computation of datum or elevation statics before the separation of each refractor wave, and wherein the processor computes and applies residual statics to each refractor mini-volume.

14. The system of claim 11, wherein the seismic refraction data is filtered by the first filtering means on the basis of the refracted wave data.

15. The system of claim 11, wherein the output device includes a printer for printing the visual displays for comparison.

16. The system of claim 11 which further includes:
- o. means for receiving siting data for siting new wells for drilling in areas that are displaced from any drilling hazards identified by the identifying means.

17. The system of claim 11 which further comprises:
- means for plotting the location of proposed wells in the same visualization program;
- means for computing and storing refractor amplitude and frequency responses; and
- means for computing depth and/or time correlations with the original reflection data.

18. The system of claim 11 in which the processor includes signal processing means for performing an analysis for drilling hazards located at about less than four thousand feet below the earth's surface.

19. The system of claim 18, wherein the processor determines a depth on the basis of the design of the original seismic acquisition survey and the maximum recorded offset ranges.

20. The system of claim 11, wherein the output device includes:
- a display for displaying a three-dimensional representation of the processed seismic data from the three-dimensional visualization computer program.

* * * * *